United States Patent
Fukuyama

(10) Patent No.: US 8,129,687 B2
(45) Date of Patent: Mar. 6, 2012

(54) LIGHTING SYSTEM, METHOD OF LIGHTING, OPTICAL DETECTOR, AND METHOD OF OPTICAL DETECTION

(75) Inventor: Hiroya Fukuyama, Machida (JP)

(73) Assignee: Olympus Corporation, Tokyo (JP)

( * ) Notice: Subject to any disclaimer, the term of this patent is extended or adjusted under 35 U.S.C. 154(b) by 554 days.

(21) Appl. No.: 12/308,619

(22) PCT Filed: Jun. 6, 2007

(86) PCT No.: PCT/JP2007/061427
§ 371 (c)(1),
(2), (4) Date: Dec. 18, 2008

(87) PCT Pub. No.: WO2007/148532
PCT Pub. Date: Dec. 27, 2007

(65) Prior Publication Data
US 2010/0230611 A1    Sep. 16, 2010

(30) Foreign Application Priority Data
Jun. 23, 2006  (JP) .................................. 2006-174447

(51) Int. Cl.
*G01N 23/02* (2006.01)
*G02B 21/06* (2006.01)

(52) U.S. Cl. ........ 250/368; 250/310; 250/311; 359/368; 359/385; 359/434

(58) Field of Classification Search .................. 250/310, 250/311, 368; 359/368, 385, 434
See application file for complete search history.

(56) References Cited

U.S. PATENT DOCUMENTS

| | | | |
|---|---|---|---|
| 4,206,349 A * | 6/1980 | Kamimura | 250/311 |
| 4,867,535 A * | 9/1989 | Duchenois | 359/896 |
| 6,078,643 A | 6/2000 | Vogelsong et al. | |
| 7,304,789 B2 * | 12/2007 | Hirata et al. | 359/368 |
| 2005/0174040 A1 | 8/2005 | Jung et al. | |
| 2005/0200947 A1 * | 9/2005 | Hirata et al. | 359/368 |
| 2006/0077556 A1 | 4/2006 | Li et al. | |
| 2006/0077566 A1 * | 4/2006 | Nishioka | 359/708 |
| 2006/0109558 A1 | 5/2006 | Nishioka | |

(Continued)

FOREIGN PATENT DOCUMENTS

JP    63-252350    10/1988

(Continued)

OTHER PUBLICATIONS

Pendry, "Negative Refraction Makes a Perfect Lens," Physical Review Letters 85(18): 3966-3969 (Oct. 30, 2000).

(Continued)

*Primary Examiner* — David Porta
*Assistant Examiner* — Casey Bryant
(74) *Attorney, Agent, or Firm* — Kenyon & Kenyon LLP

(57) ABSTRACT

There is provided a lighting system having a high spatial resolution appropriate to a high-frequency component by evanescent waves in a negative refraction lens. The lighting system includes a light emitter thin film (106) which includes a light emitting material which emits light when an energy is applied, a cathode (101) for applying an electron beam (102) which is the energy, to the light emitter thin film (106), and a negative refraction lens (110) which is formed of a material exhibiting negative refraction, and has an optical system for projecting light emitted from the light emitter thin film (106), on an object.

9 Claims, 20 Drawing Sheets

U.S. PATENT DOCUMENTS

2010/0002291 A1* 1/2010 Fukuyama ................ 359/385

FOREIGN PATENT DOCUMENTS

| | | |
|---|---|---|
| JP | 04-312752 | 11/1992 |
| JP | 05-088165 | 4/1993 |
| JP | 06-079110 | 10/1994 |
| JP | 08-031303 | 2/1996 |
| JP | 2000-081484 | 3/2000 |
| JP | 2000-208089 | 7/2000 |
| JP | 2002-296117 | 10/2002 |
| JP | 2003-149119 | 5/2003 |
| JP | 2004-227822 | 8/2004 |
| JP | 2005-222943 | 8/2005 |
| JP | 2006-040835 | 2/2006 |
| JP | 2006-049904 | 2/2006 |
| JP | 2006-072237 | 3/2006 |
| JP | 2006-112985 | 4/2006 |
| JP | 2006-138633 | 6/2006 |
| WO | WO 93/06616 | 4/1993 |

OTHER PUBLICATIONS

Veselago, "*The Electrodynamics of Substances with Simultaneously Negative Values of $\epsilon$ and $\mu$,*" Soviet Physics Uspekhi 10(4): 509-514 (Jan. 1, 1969).

European Office Action, issued in corresponding European Patent Application No. 07744770.4.

International Preliminary Report on Patentability dated Jan. 15, 2009, International Application No. PCT/JP2007/061427 filed Jun. 6, 2007.

Veselago et al., "The Electrodynamics of Substances with Simultaneously Negative Values of $\epsilon$ and $\mu$", Soviet Physics Uspekhi 10(4): pp. 509-514, 1968.

Hecht, "Optics", $4^{th}$ ed., pp. 471-471 (Addison-Wesley, Reading, MA), 2002.

Pendry, "Negative Refraction Makes a Perfect Lens", Physical Review Letters 85(18): pp. 3966-3969, 2000.

Smith et al., "Composite Medium with Silultaneously Negative Permeability and Permittivity", Physical Review Letters 84(18): pp. 4184-4187, 2000.

Notomi, "Theory of Light Propagation in Strongly Modulated Photonic Crystals: Refractionlike Behavior in the Vicinity of the Photonic Band Gap", Physical Review B 62(16): pp. 10696-10705, 2000.

Valanju et al., "Wave Refraction in Negative-Index Media: Always Positive and Very Inhomogeneous", Physical Review Letters 88(18): pp. 187401, 2002.

Schurig et al., "Negative Index Lens Aberrations", Physical Review E 70, pp. 065601, 2004.

Smith et al., "Limitations on Subdiffraction Imaging with a Negative Refractive Index Slab", Applied Physics Letters 82(10): pp. 1506-1508, 2003.

Tsujiuchi et al., "Handbook of Advanced Optical Technologies" (with English translation of Fig. 1.5.2), pp. 194, (Asakura Shoten, 2002).

Pendry, "A chiral Route to Negative Refraction", Science 306, pp. 1353-1355, 2004.

Ramakrishna, "Spherical Perfect Lens: Solution of Maxwell's Equations for Spherical Geometry", Physical Review B 69, pp. 115115, 2004.

* cited by examiner

LIGHTING SYSTEM, METHOD OF LIGHTING, OPTICAL DETECTOR, AND METHOD OF OPTICAL DETECTION

CROSS-REFERENCE TO RELATED APPLICATION

The present application is based upon and claims the benefit of priority from the prior Japanese Patent Application No. 2006-174447 filed on Jun. 23, 2006; the entire contents of which are incorporated herein by reference.

TECHNICAL FIELD

The present invention relates to a lighting system, a method of lighting, an optical detector, and a method of optical detection which can be used in an optical image detector such as a microscope, a camera, and an endoscope, an optical information writing and reading apparatus such as a pickup for an optical disc, and a lithographic apparatus such as a stepper.

BACKGROUND ART

In recent years, a resolution capacity of an image detecting apparatus in which, an image pickup optical system such as a microscope, a camera, and an endoscope is used has improved. Particularly, in a field of microscopes and optical recording, an optical system with almost no aberration has been realized, and a resolution capacity as an image pickup optical system has been restricted mainly by a diffraction limit of visible light. Whereas, as it has been disclosed in the following non-patent literature, an optical material which takes a negative value of a refractive index (hereinafter, 'negative refraction material') has been realized. A proposal mentioning that an imaging of an ultra-high resolution surpassing the diffraction limit (hereinafter, 'perfect imaging') is possible when a negative refraction material is used, has been made.

As it has been disclosed in a non-patent literature 3, in a case other than a case in which, the refractive index takes a negative value, when a real part of a permittivity or a magnetic permeability is a negative value, a negative refraction phenomenon is observed for specifically polarized electromagnetic waves. Moreover, as it has been disclosed in a non-patent literature 5, in a periodic structure such as a photonic crystal, as a result of a photonic band being reflected in a reciprocal lattice space, in spite of each of the refracting index, the permittivity, and the magnetic permeability being a positive material, the negative refraction phenomenon is observed for electromagnetic waves of specific wavelength which are polarized in a specific manner.

In view of abovementioned circumstances, in this patent specification, a material which shows a negative refraction response for the specific electromagnetic waves will be called as a 'material exhibiting negative refraction'. It is needless to mention that, an expression 'a material exhibiting negative refraction' is a concept of a wider sense than the negative refraction material.

As a material exhibiting negative refraction, apart from the photonic crystal mentioned above, materials such as metallic films, chiral substances, photonic crystals, meta-materials, left-handed materials, backward wave materials, and negative phase velocity media have been known.

According to the non-patent literature 1, a material for which, both the permittivity and the magnetic permeability take the negative value, the refractive index also becomes a negative value. Furthermore, it has been shown that, such material satisfies a so-called extension of Snell's law, as it will be described later.

FIG. 17 shows refraction of light in an ordinary optical material (hereinafter called as 'an ordinary optical material') having a positive refractive index. When light is propagated from a medium 1 to a medium 2, the light is refracted at a boundary surface of both the media. At this time, Snell's law shown by the following expression (1) is satisfied.

$$n_1 \sin \theta_i = n_2 \sin \theta_r \qquad (1)$$

Here, $\theta_i$ denotes an angle of incidence, $\theta_r$ denotes an angle of emergence, $n_1$ denotes a refracting index of the medium 1, and $n_2$ denotes a refractive index of the medium 2.

Whereas, FIG. 18 shows a refraction of light when the refractive index $n_2$ of the medium 2 takes a negative value. As shown in FIG. 18, the light which is incident is refracted in a direction opposite to a direction of refraction shown in FIG. 17 with respect to a normal of the boundary surface. At this time, when the angle of refraction $\theta_r$ is let to be a negative value, the abovementioned Snell's law is satisfied.

FIG. 19 shows an imaging relationship by a convex lens 13 in which an ordinary optical material is used. Light from an object point 11A on an object plane 11 is converged to an image point 12A on an image plane 12 by the convex lens 13. When the refractive index of the lens is positive, for imaging (converging), a lens surface is required to have a finite curvature.

Whereas, a flat plate made of a material exhibiting negative refraction (hereinafter appropriately called as a 'negative refraction lens') can converge light in spite of having an infinite curvature. FIG. 20 shows an imaging relationship by a negative refraction lens 14. Light from an object point 11B on an object plane 11 is converged to an image point 12B on an image plane 12 by the negative refraction lens 14.

In non-patent literature 11, a method for realizing a non-uniform imaging by forming a curved surface lens by a material exhibiting negative refraction has been disclosed. However, a condition for the perfect imaging being extremely strict, and since a material having a predetermined refractive index gradient in addition to exhibiting negative refraction is necessary, it is not realistic. Actually, all the negative refraction lenses realized in the world have almost a uniform refractive index spatially, and a surface thereof through which light (electromagnetic waves) passes is a plane surface. Therefore, a spatially uniform flat plate made of a material exhibiting negative refraction will here onward be called appropriately as a 'negative refraction lens'.

Here, 'spatially uniform' means that, it is uniform with a scale which is larger than a wavelength of the electromagnetic waves. Consequently, it means that, in a case of realizing the negative refraction by an artificial structural material such as photonic crystal and a meta-material, an effective refractive index (or an effective permittivity or an effective magnetic permeability) which is attributable to the structure is spatially uniform.

In an imaging optical system such as a microscope, a theoretical upper limit value of resolution is determined by a diffraction limit. As it has been described in a textbook of optics (non-patent literature 2 for example), according to Rayleigh criterion, the minimum distance between two resolvable points is about $\lambda/NA$. Here, $\lambda$ is a wavelength used, and NA is a numerical aperture. Moreover, a structure smaller than the diffraction limit cannot carry out image dissection by an optical system.

Moreover, a microscope and an optical pickup which improve resolution by using an objective lens of a liquid immersion, an oil immersion, and a solid immersion have been proposed. These increase an effective NA. Accordingly, the value of λ/NA corresponding to the diffraction limit is made is decreased. Here, it is not possible to make the numerical aperture NA larger than a refractive index of a medium in which, an object plane is disposed. Therefore, an upper limit of the numerical aperture NA is about 1.5 to 2.0.

Light which has been emitted from the object point 11A on the object plane 11 is formed of two light waves namely, radiation light which reaches a far distance, and evanescent waves which are attenuated at a distance of about wavelength from the object point 11A. The radiation light corresponds to a low-frequency component of information on the image plane 11. Whereas, the evanescent waves correspond to a high-frequency component of the information on the image plane 11.

A boundary of the radiation light and the evanescent waves has a spatial frequency equivalent to $1/\lambda$. Particularly, the evanescent waves have frequency within the object plane larger than $1/\lambda$. Therefore, the evanescent waves have a wave number component in a direction of propagation of light waves perpendicular to the evanescent waves becoming an imaginary number. Therefore, there is a rapid attenuation with receding from the object plane 11.

All the components of the radiation light on the other hand do not advance to the optical system. A part of the radiation light is vignetted by an aperture in the optical system. Therefore, only a component smaller than NA/λ of the spatial frequency on the object plane 11 reaches the image plane 12. Eventually, in the information reaching the image point 12A, the high-frequency component from the information held by the object point 11A is missing. Accordingly, this becomes a spreading of a point image by diffraction, and restricts the resolution.

In non-patent literature 3 disclosed in recent years, it has been disclosed that the abovementioned evanescent waves are amplified in the negative refraction material. Therefore, in imaging by the negative refraction lens 14 shown in FIG. 20, the amplitude of the evanescent waves on the image plane 12 is shown to have been recovered to a level same as on the object plane 11. In other words, in the optical system shown in FIG. 20, both the radiation light and the evanescent waves are propagated from the object plane 11 to the image plane 12. Therefore, information of the object point 11B is completely reproduced at the imaging point 12B. This means that, when an imaging optical system in which the negative refraction lens 14 is used, perfect imaging in which the diffraction limit is not restricted is possible.

The abovementioned perfect imaging is not only a theoretical phenomenon. A negative refraction lens has actually been manufactured, and experiments have been reported. For instance, in non-patent literature 4, a meta-material in which, a rod and a metallic coil smaller than the wavelength, are arranged periodically, have been manufactured. Moreover, such meta-material has been reported to function as a negative refraction lens in a microwave range.

Moreover, in non-patent literature 5, a method of manufacturing a negative refraction material by using photonic crystal has been disclosed. In the photonic crystal, in which an air rod is disposed in a hexagonal lattice form in a dielectric substance, there exists a photonic band in which, the effective refractive index is isotropic as well as negative. Furthermore, the photonic crystal can be deemed as a two-dimension uniform negative refraction material with respect to electromagnetic waves of a frequency band suitable for a photonic band.

There has been a theoretical counterargument as described in non-patent literature 6 for example, to the perfect imaging by the negative refraction lens, which lead to a controversy. However, in recent years, a theory of the negative refraction lens disclosed in non-patent literature 3 has been generally accepted.

In an optical system in which, an ordinary optical material is used, it is possible to create an aplanatic point, in other words, a point at which, a spherical aberration and coma aberration become zero simultaneously. An image by this optical system always becomes a virtual image. Here, when a negative refraction material is used, it is possible to form a real image by arranging an object plane at the aplanatic point (refer to non-patent literature 7 for example). In this manner, by using a negative refraction material, unique optical designing which was not available so far becomes possible.

Moreover, it has been known that for many metals, a real part of permittivity with respect to visible light becomes negative. For instance, according to non-patent literature 9, silver exhibits a negative permittivity for light of a wavelength in a range of 330 nm to 900 nm. Furthermore, according to non-patent literature 10, even in a chiral substance having a helical structure, there exists a photonic band exhibiting negative refraction.

Phenomenon of negative refraction has unique characteristics which are different from an ordinary optical material, such as having a negative angle of refraction, having a phase velocity and a group velocity in opposite direction, and an electric field, a magnetic field, and a wave number vector forming a left-handed system in this order.

A name of a material exhibiting negative refraction has not yet been established in general. Therefore, prefixing the abovementioned characteristics, a material exhibiting negative refraction is also called as a negative phase velocity material, a left-handed material, a backward-wave material, and a negative refraction material. In this patent specification, it will be treated as a type of such material exhibiting negative refraction. Such treatment is does not contradict at all to a definition of the abovementioned material exhibiting negative refraction.

Moreover, there exist many names prefixed by phenomenon overlapping with names in which a material or a structure is prefixed. For instance, a meta-material which is made of a metal resonator array is sometimes also called as a left-handed substance or a left-handed metamaterial. Such materials are also to be included in materials exhibiting negative refraction.

In this manner, when a negative refraction lens which is formed of a negative refraction material is used, there is a possibility of realizing an imaging optical system of ultra-high resolution (perfect imaging) not constrained to diffraction limit (refer to non-patent literature 3, for example). Furthermore, even in a case of imaging only the radiation light, a unique optical design is possible (refer to non-patent literature 7, for example).

Non-patent literature 1: V. G. Veselago et al., Sov. Phys. Usp. 10, 509 (1968)

Non-patent literature 2: E. Hecht, "Optics", 4th ed. (Addison-Wesley, Reading, Mass., 2002)

Non-patent literature 3: J. B. Pendry, Phys. Rev. Lett. 85, 3966 (2000)

Non-patent literature 4: D. R. Smith et al., Phys. Rev. Lett. 84, 4184 (2000)

Non-patent literature 5: M. Notomi, Phys. Rev. B62, 10696 (2000)

Non-patent literature 6: P. M. Valanju et al., Phys. Rev. Lett. 88, 187401 (2002)

Non-patent literature 7: D. Schurig et al., Phys. Rev. E70, 065601 (2004)

Non-patent literature 8: D. R. Smith et al., Appl. Phys. Lett. 82, 1506 (2003)

Non-patent literature 9: "Latest Optical Technology Handbook" by Tsujiuchi Junpei et al., (Published by Asakura Shoten)

Non-patent literature 10: J. B. Pendry, Science 306, 1353 (2004)

Non-patent literature 11: S. A. Ramakrishna et al., Phys. Rev. B69, 115115 (2004)

As it has been described above, the negative refraction lens forms an image in which, the high-frequency component is retained by transmitting the evanescent waves. However, for generating arbitrarily some sort of optical image having the high-frequency component by using a negative refraction lens, or for detecting the high-frequency component from an optical image generated from an object etc. by a negative refraction lens, there are following issues related to a method of lighting and a method of detection.

Firstly, let us consider a case in which, an attempt is made to detect a desired high-frequency component by an optical system generated from an object etc. by a negative refraction lens. The perfect imaging of the negative refraction lens is always the same size magnification imaging. Moreover, even when the same magnified image is supposedly magnified by an Ordinary magnifying optical system; the evanescent waves are not transmitted to the magnified image. Consequently, the high-frequency component is lost, and it is not possible to detect the high-frequency component from the magnified image.

In other words, for detecting information of a certain desired high-frequency component, it is necessary that a detector is placed directly on a same magnified-image plane by the negative refraction lens, and that the detector has a detection band spatial resolution larger than the desired high-frequency component.

Such type of problem exists similarly when an attempt is made to generate arbitrarily on an object, some sort of an optical image having the desired high-frequency component by using the negative refraction lens. In other words, it is necessary that illuminating light is modulated spatially on the same magnified imaging plane (conjugate plane of object which is intended) by the negative refraction lens, and that a light source (illuminating light source) has a modulation band (spatial resolution) larger than the desired high-frequency component.

Concrete problems in the detector and the light source in a case of detecting the high-frequency component of an optical image by the negative refraction lens will be described below, taking a microscope as an example. A two-point resolution of a microscope having an ordinary water-immersion objective lens is approximately 0.3 μm. The wavelength is let to be 0.5 μm, the numerical aperture is let to be 0.75, and refractive index of water is let to be 1.333.

Whereas, for a microscope with a negative refraction lens as the objective lens, to have ten times two-point resolution of the ordinary microscope, in other words, to have two-point resolution of 0.03 μm, the detector or the light source is required to have resolution higher than that. This means that, in a case of using a two-dimensional image pickup element such as a CCD (Charge Coupled Device) and a CMOS (Complementary Metal Oxide Semiconductor), a pixel interval (pixel dimension) has to be not more than half of 0.03 μm, in other words, not more than 0.015 μm.

Moreover, even in a case of a scanning microscope which detects a signal of an image by scanning by moving one or a plurality of detectors or light sources relatively with an object, a size of the detector and the light source has to be not more than 0.015 μm similarly as in a case of the image sensor described above.

However, manufacturing of such extremely small detector and light source is not easy. For instance, the smallest pixel interval in a CCD which is currently being used practically is approximately 2 μm. Consequently, for a CCD to achieve the resolution shown in the abovementioned example, in other words, to achieve the pixel interval not more than 0.015 μm, it is necessary to have densification of not lens than 130 times now onward. This technological degree of difficulty is extremely high.

Moreover, an SNOM (Scanning Near field Optical Microscope) is available as an optical microscope of super resolution which is currently being used practically. Even for an aperture portion of a front end of a probe which is used as a detector and a light source in the SNOM, a diameter is approximately 0.05 μm to 0.1 μm. This is three times larger than the condition shown in the abovementioned example, in other words, three times larger than the diameter of 0.015 μm or less of the detector and the light source.

The present invention is made in view of the abovementioned issues, and an object of the present invention is to provide a lighting system, method of lighting, optical detector, and method of optical detection having a high spatial resolution appropriate for a high-frequency component by the evanescent waves in a negative refraction lens

DISCLOSURE OF THE INVENTION

To solve the abovementioned issues and to achieve the object, according to the present invention, there can be provided a lighting system including a light emitter which includes a luminescent material which emits light when an energy is applied thereon, a probe for applying the energy to the light emitter, and an optical system which includes an optical element which is formed of a material exhibiting negative refraction, and which is for projecting the light emitted from the light emitter, on an object.

Moreover, according to a preferable aspect of the present invention, it is desirable that the light emitter is in a form of a thin film.

Moreover, according to a preferable aspect of the present invention, it is desirable that an electron beam is used as the energy to be applied to the light emitter.

Moreover, according to a preferable aspect of the present invention, it is desirable that an electrode made of an electroconductive material and having as shape of a protrusion is used as the probe.

Moreover, according to the present invention, there can be provided a method of lighting including a light emitting step of irradiating light by applying an energy to a light emitter which includes a light emitting material which emits light, and a projection step of projecting on an object, light from the light emitter via an optical system which includes an optical element which is formed of a material exhibiting negative refraction.

Moreover, according to the present invention, there can be provided an optical detector including a light source which illuminates an object, an optical detecting body which is made of a photoconductive material, an optical system which includes an optical element formed of a material exhibiting negative refraction, and which projects on the optical detecting body, object light which is emitted from the object, and a probe for applying an energy to an area smaller than a diffraction limit of the object light, of the optical detecting body.

Moreover, according to a preferable aspect of the present invention, it is desirable that the optical detecting body is in a form of a thin film.

Moreover, according to a preferable aspect of the present invention, it is desirable that an electron beam is used as the energy to be applied to the light emitter.

Moreover, according to a preferable aspect of the present invention, it is desirable that an electrode made of an electroconductive material, and having a shape of a protrusion is used as the probe.

Moreover, according to the present invention, there can be provided a method of optical detection including a lighting step of lighting an object, an object light irradiation step of emitting object light by the object by lighting, a projection step of projecting the object light on a optical detecting body made of a photoconductive material, via an optical system which includes a light emitting material which emits light, a photoconduction step of exhibiting photoconduction by the optical detecting body by the object light being projected, and a photoconduction detection step of detecting the photoconduction by applying an energy to an area smaller than a diffraction limit of the object light, of the optical detecting body.

According to the present invention, there is shown an effect that it is possible to provide a lighting system, method of lighting, optical detector, and method of optical detection having a high spatial resolution appropriate to a high-frequency component by evanescent waves in a negative refraction lens.

BEST MODE FOR CARRYING OUT THE INVENTION

Exemplary embodiments of a lighting system, a method of lighting, an optical detector, and a method of optical detection according to the present invention will be described below in detail by referring to the accompanying diagrams. However, the present invention is not restricted to the embodiments described below.

First Embodiment

Figure 1:
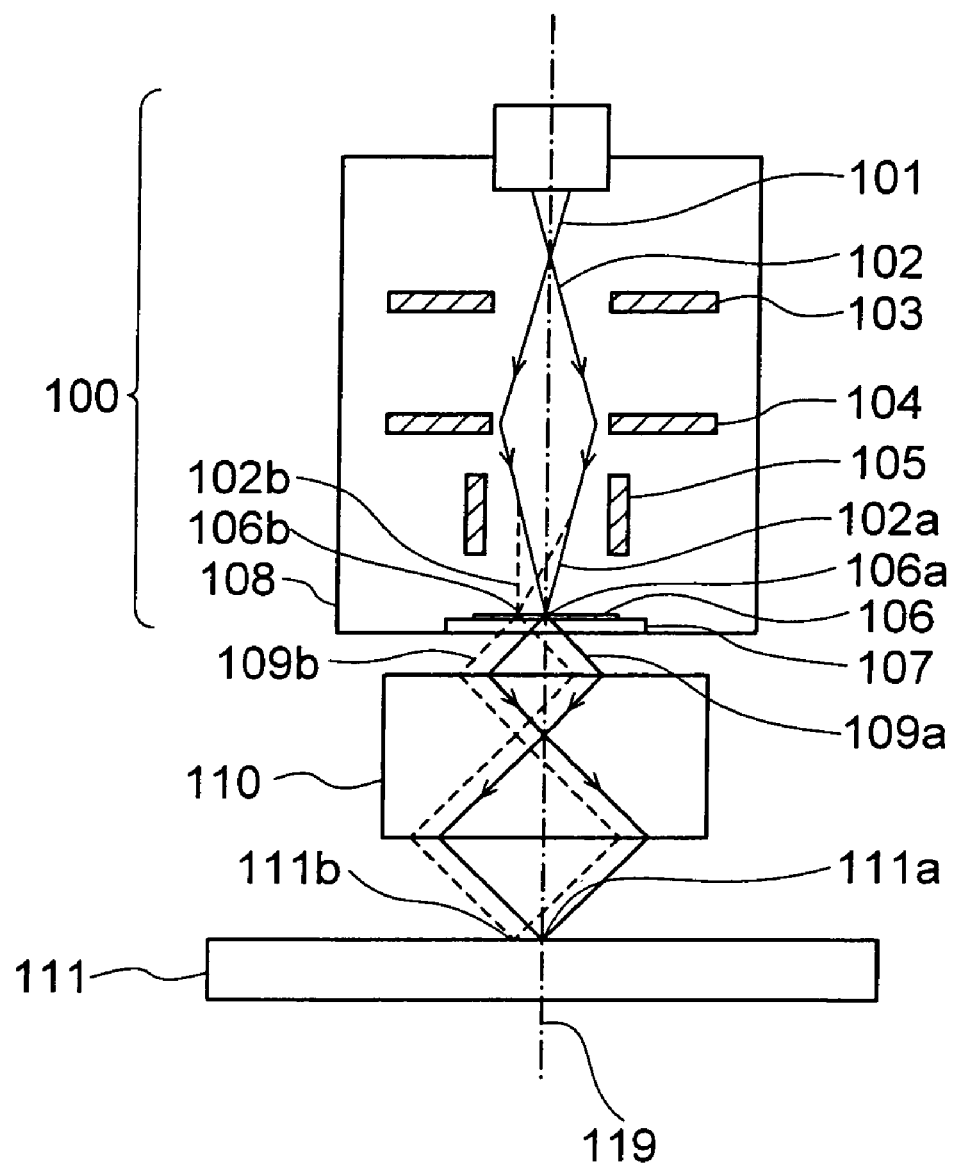
FIG. 1 is a diagram showing a schematic structure of an electron beam excitation light source according to a first embodiment of the present invention.

An electron beam excitation light source according to a first embodiment of the present invention will be described below. FIG. 1 shows a schematic structure of an electron beam excitation light source 100 according to the first embodiment of the present invention. A cathode 101 which discharges electrons, supplies an electron beam 102 which is made of electrons discharged. An anode (an accelerating electrode) 103 applies an acceleration voltage to the electrons discharged. An electron lens 104 converges the electron beam. The cathode 101, the anode (accelerating electrode) 103, and the electron lens 104 correspond to a probe, and the electron beam 102 corresponds to an energy.

A deflector 105 deflects the electron beam in a direction orthogonal to a central axis 119. Moreover, the light emitter thin film 106 is formed of a light emitting material. An optical window 107 is formed of an optically transparent material. A vacuum chamber 108 is formed to maintain low, an air pressure in a path of the electron beam. The vacuum chamber 108 accommodates the cathode 101, the anode (accelerating electrode) 103, and the deflector 105. Light 109 emitted by the light emitter thin film 106 is incident on a negative refraction lens 110 which is made of a negative refraction material. Moreover, light emerged from the negative refraction lens 110 is irradiated on an object 111.

The electrode beam 102 made of electrons discharged from the cathode 101 is accelerated by an electric field formed by the anode 103. A de Broglie wavelength $\lambda$ (nm) of the electron beam accelerated at voltage E (V) is obtained by the following expression (2).

$$\lambda = h \cdot (2meE)^{-0.5} = (1.504/E)^{0.5} \quad (2)$$

Here, h is Planck's constant ($6.624 \times 10^{-34}$ J·s),
m is a mass of electrons ($9.107 \times 10^{-31}$ kg), and
e is an electric charge of electrons ($1.602 \times 10^{-19}$ C).

According to the expression (2), when E=100 (V) for example, $\lambda$=0.1226 (nm). Moreover, when E=1 (kV), $\lambda$=0.03878 (nm). Furthermore, when E=100 (kV), $\lambda$=0.003878 (nm). In this manner, the de Broglie wavelength of the electron beams becomes a wavelength far shorter than a wavelength of light such as visible light, as it has been widely known.

The accelerated electron beam 102 is converged at the electron lens 104. Moreover, the electron beam 102 is irradiated on the light emitter thin film 106 as a converged electron beam 102a. It is possible to narrow down easily a diameter of the electron beam at this time to about 1 nm by increasing an acceleration voltage sufficiently, and adjusting a focal point by the electron lens 104. Furthermore, by using a lens in which a spherical aberration is corrected favorably, as the electron lens 104, it is also possible to narrow down the diameter of the electron beam to about 0.1 nm.

An area of the light emitter thin film 106 irradiated by the electron beam 102a is excited by electrons which are irradiated. Accordingly, this area becomes a spot light source area 106a and emits light 109a. The light 109a is transmitted through the optical window 107, and is incident on the negative refraction lens 110. Further, by a perfect imaging effect of the negative refraction lens 110, the spot light source area 106a is projected on the object 111. As a result of this, an image of the spot light source area 106a is formed as a spot illuminated area 111a on the object 111.

In this manner, spot light having a diameter same as a diameter of the converged electron beam 102a is formed on the object 111. Consequently, according to this embodiment, it is possible to light the object 111 by the spot light of a diameter same as in a case of lighting by an electron beam, in other words, a diameter in a range of 1 nm to 0.1 nm which was not possible so far.

Moreover, it is possible to deflect the converged electron beam 102a in a direction orthogonal to the central axis 119 by the deflector 105. For example, when the converged electron beam 102a is deflected to a left side in the diagram, it becomes a deflected converged beam 102b. At this time, the spot light source area 106a of the light emitter thin film 106 moves to a spot light source area 106b.

Similarly, the light 109a moves to light 109b. Moreover, the spot illuminated area 111a on the object 111 moves to a spot illuminated area 111b. Here, it is possible to control arbitrarily a direction of deflection and an amount of deflection of the converged electron beam 102a by the deflector 105. Accordingly, it is possible to scan by moving arbitrarily also the spot illuminated area 111a on the object 111 by the abovementioned effect. At this time, it is desirable to make small a movement step of scanning according to a spot diameter.

Regarding this embodiment, by applying to the object 111 an object which needs irradiation of minute and high resolution, application in various fields are possible. In other words, when a heat sensitive material or a photosensitive material is used, it is possible to let to be an exposing unit for lithography which manufactures minute structures such as a semiconductor and a micro machine. Moreover, it is also possible to let to be a writing unit for an optical information equipment such as an optical disc.

Moreover, by using an optical detector which is not shown in the diagram, a structure may be let to be such that it detects an object light such as a reflected light, transmitted light, scattered light, and fluorescence emitted from the object 111 by irradiating the light 109, and when an optical information equipment medium such as an optical disc is used as the object 111, it is possible to let it to be a reading apparatus for the optical information equipment. Furthermore, when an object for observation of an optical image is used as the object 111, it becomes an optical image observation apparatus such as a camera and a microscope.

In all these fields of application, it is possible to realize a high spatial resolution of an optical beam level which has not been possible so far by a diffraction limit of light in a conventional optical means. Besides, when this embodiment is compared with a structure and a method in which the electron beam is irradiated directly on the object 111, such as an electron microscope and an electron beam exposing apparatus, it has many advantages. In other words, particles to be irradiated (wave motion) being light, an energy is lower than the electron beam. Therefore, the object 111 does not have any damage as in a case in which the electron beam is irradiated.

Moreover, it is not necessary to place the object 111 in vacuum, and further, it may be handled upon placing in any environment and medium provided that it is a substance which allows the light to be transmitted irrespective of whether it is a gas, a liquid, or a solid. Consequently, there are extremely few constraints on use. Furthermore, whereas, the electron beam does not affect except a surface of the object 111, when the object 111 is transparent, the light 109 can affect up to an inside of the object.

In this embodiment, as the cathode 101, a form and a structure are immaterial provided that it has an effect of discharging electrons in a space, such as a thermionic emission type in which, electrons are discharged by heating an electrode, and a field emission type in which electrons are discharged from an electrode by a high electric field. Moreover, as an electron lens, an electromagnetic lens which carries out converging of electron beams by a magnetic field, or an electrostatic lens which carries out converging of electron beams by an electrostatic field may be used. The deflector 105 may also similarly be of an electromagnetic type or an electrostatic type.

As a material of the light emitter thin film 106, any material, provided that it is a substance which emits light by irradiation of electron beam may be used. For example, it may be a material which is excited to a high-energy state by irradiation of electron beam, and which exhibits cathodoluminescence in which light is emitted during a process of returning to a low-energy state, or may be a substance which exhibits bremsstrahlung in which, the electrons directly emit light during a process of deceleration of an irradiated electron beam in that medium.

As a substance exhibiting cathode luminescence, fluorescent substances and phosphorescent substances are available, and both these substances can be used. More preferably, due to a reason of even shorter afterglow time, the fluorescent substance is appropriate than the phosphorescent substance. This is because, when the afterglow time is long, with a deflection scanning of the electron beam, an area of the spot light source area 106a becomes large substantially, and this leads to a decrease in the spatial resolution.

As a fluorescent substance, the following can be used preferably.

diamond
hBN (hexagonal boron nitride)
ZnS: Ag
ZnS: Au, Al
ZnS: Cu, Al
ZnS: Au, Cu, Al ZnO: Zn
ZnGa$_2$O$_4$: Mn
ZnGa$_2$O$_4$
(Zn$_{0.55}$, Cd$_{0.45}$)S: Ag, Cl
(Zn$_{0.40}$, Cd$_{0.60}$)S: Ag, Cl
(Zn$_{0.30}$, Cd$_{0.70}$)S: Ag, Cl
(Zn$_{0.22}$, Cd$_{0.78}$)S: Ag, Cl Moreover, as a phosphorescent substance, the following can be used preferably.
Y$_2$O$_2$S: Eu$^d$
YVO$_4$: Eu
Zn$_2$SiO$_4$: Mn, As
g-Zn$_3$ (P$_4$)$_2$: Mn
ZnS: Ag, Ga, Cl As a bremsstrahlung in electron beam, an optical transition radiation (OTR) in which, electrons at the time of being incident on a medium having a different permittivity are irradiated from a boundary surface of medium, is available. As a substance which causes optical transition radiation, a metal or a dielectric substance may be used. In a case of a metal, a metal such as silver, aluminum, or stainless steel can be used.

A merit of using optical transition radiation light as the light source is that the afterglow time is extremely short. As it has been described above, for suppressing the decrease in the spatial resolution which occurs with the deflection scanning, the short afterglow time is desirable. For example, the afterglow time for an ordinary fluorescent substance is about 1 ms to 1 μs, and even for a fast-response fluorescent substance, the afterglow time is 2 ns (=2×10$^{-9}$ sec). Whereas, the afterglow time for the optical transition radiation light is ps, or in other words, about 10$^{-12}$ sec, thereby making it possible to make much shorter.

Next, the light emitter thin film 106 in the abovementioned structure will be described below. From among the structural components in each embodiment which will be described below, same reference numerals are assigned to components which are common as in the first embodiment described earlier, and the description to be repeated is omitted.

Figure 2:
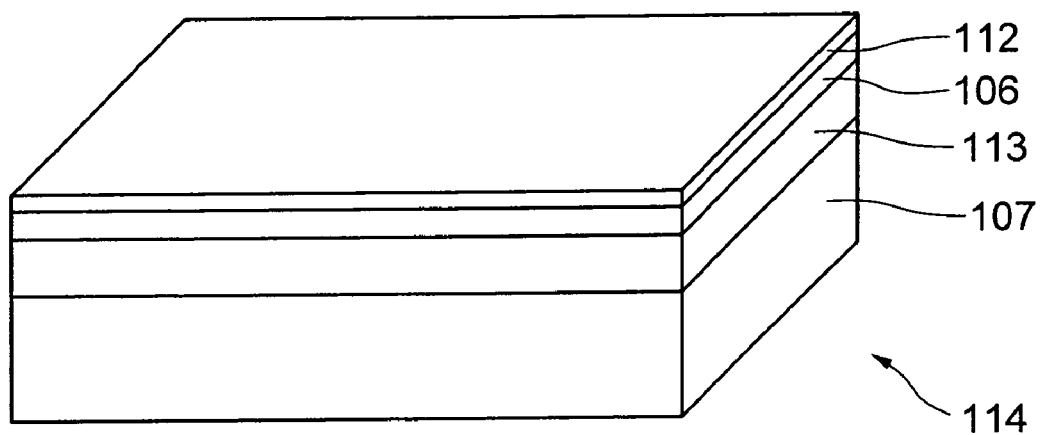
FIG. 2 is a diagram showing a schematic structure of a light emitter thin film with an electroconductive layer in the first embodiment.

FIG. 2 shows a schematic structure of a light emitter thin film 114 with an electroconductive layer (hereinafter, 'electroconductive layer light emitter thin film 114 ') which is a preferable form in a case of using a substance exhibiting cathodoluminescence as the light emitter thin film 106 in particular, in the first embodiment.

In this diagram, an electroconductive layer 112 has a function of removing electrons which have charged the light emitter thin film 106. A transparent electroconductive layer 113 removes electrons which have transmitted through the light emitter thin film 106, as well as allows the light 109 emitted from the light emitter thin film 106 to be transmitted through. It is desirable that the electroconductive layer 112 and the transparent electroconductive layer 113 are kept at an electric potential same as of the anode 103 and the vacuum chamber 108 respectively in FIG. 1.

When the electroconductive layer light emitter thin film 114 is used, it is possible to let the electric potential in the vacuum chamber 108 to be almost constant. Therefore, there is an effect that it is possible to reduce shifting of an irradiated position due to a path of the electron beam 102 being disturbed by an unnecessary electric field. Furthermore, even when a surface of the light emitter thin film 106 is charged supposedly, the electrons are removed rapidly via the electroconductive layer 112.

Moreover, even when a part of the electron beam irradiated on the light emitter thin film 106 has passed through the light emitter thin film 106, those electrons are removed rapidly via the transparent electroconductive layer 113. Consequently, the light emitter thin film 106 and the optical window 107 are not charged by the irradiation of the electron beam 102. As a result of this, there is shown an effect that, the electric potential in the vacuum chamber 108, particularly near the light emitter thin film 106 is maintained to be constant all the time.

As the electroconductive layer 112, it is required to have an electroconductive property, and a property that makes an electron beam be irradiated from an upper side in the diagram to reach the light emitter thin film 106 at a lower side thereof without being blocked. As a material for this purpose, it is desirable to use carbon, gold, platinum, or aluminum, and to form a film of a thickness not more than ten-odd nm.

As the transparent electroconductive layer 113, it is required to have an electroconductive property, and to make light emitted from the light emitter thin film 106 reach the optical window 107 under it. As a material for this purpose, a zinc oxide material, an indium oxide material, or a tin oxide material is preferable.

In a case of a zinc oxide material, AZO (aluminum doped zinc oxide) in which, few percent of Al$_2$O$_3$ is added to ZnO, or GZO (gallium doped zinc oxide) in which, few percent of Ga$_2$O$_3$ is added to ZnO is desirable. As a case of an indium oxide material, ITO (indium tin oxide) in which, few percent of SnO$_2$ is added to In$_2$O$_3$ is desirable. In case of a tin oxide material, FTO (fluorine doped tin oxide) in which, fluorine is added to tin oxide is desirable.

Figure 3:
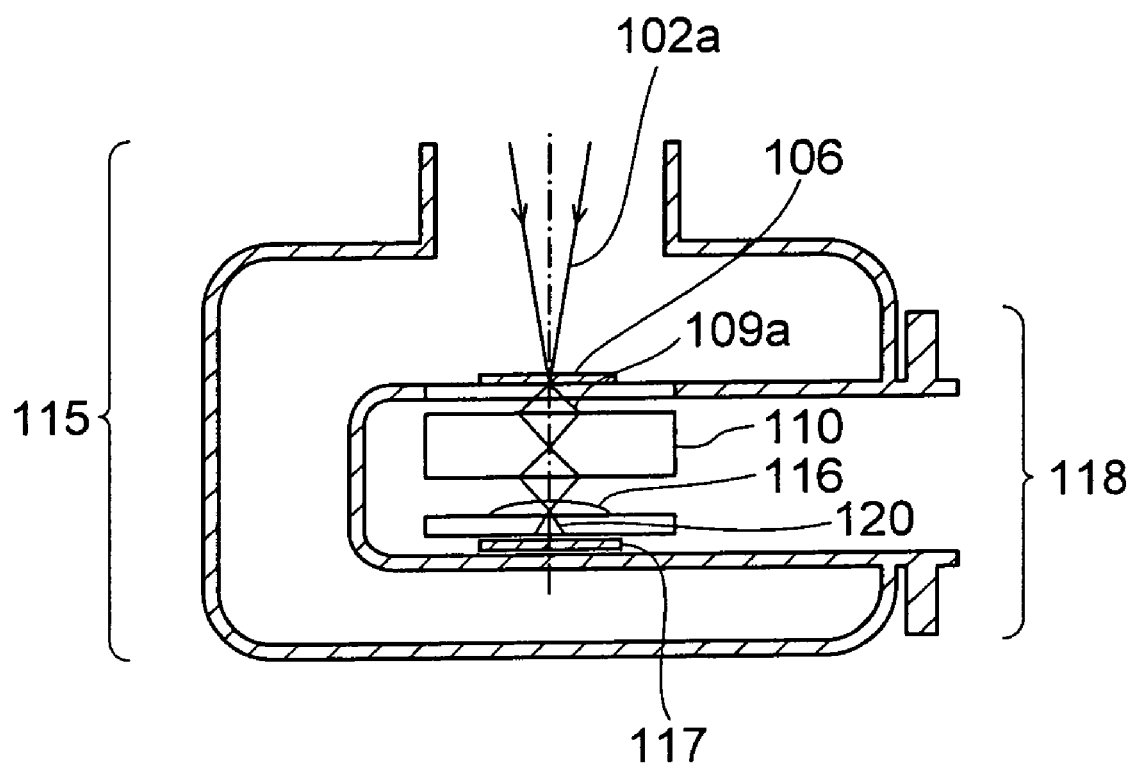
FIG. 3 is a diagram showing a schematic structure of an optical image observation unit for an electron microscope in the first embodiment.

Next, an example of a microscope which includes the lighting system according to the present invention will be described. FIG. 3 shows a schematic structure of a scanning electron microscope (SEM) optical image observation unit 118. A microscopic specimen 116 is mounted inside a specimen room 115 in a vacuum chamber of the SEM. An optical detector 117 detects an object light 120, which the microscopic specimen 116 emits by light being irradiated thereon.

The SEM optical image observation unit 118 is structured to be detachable from the specimen room 115 of the SEM. When the SEM optical image observation unit 118 is mounted, the observation of an optical image with a spatial resolution having a high electron beam level becomes possible. In other words, there is an advantage that with one SEM, not only the observation of SEM image but also the observation of optical image with high resolution becomes possible.

The object light 120 in FIG. 3 is characterized as transmission light from the microscopic specimen 116. However, without restricting to this, by selecting appropriately a type and arrangement of the optical detector 117, it is possible to detect all types of object lights 120 which the microscopic specimen 116 emits, such as fluorescent light, reflected light, forward-scattered light, backscattering light, and Raman scattering light.

Figure 4:
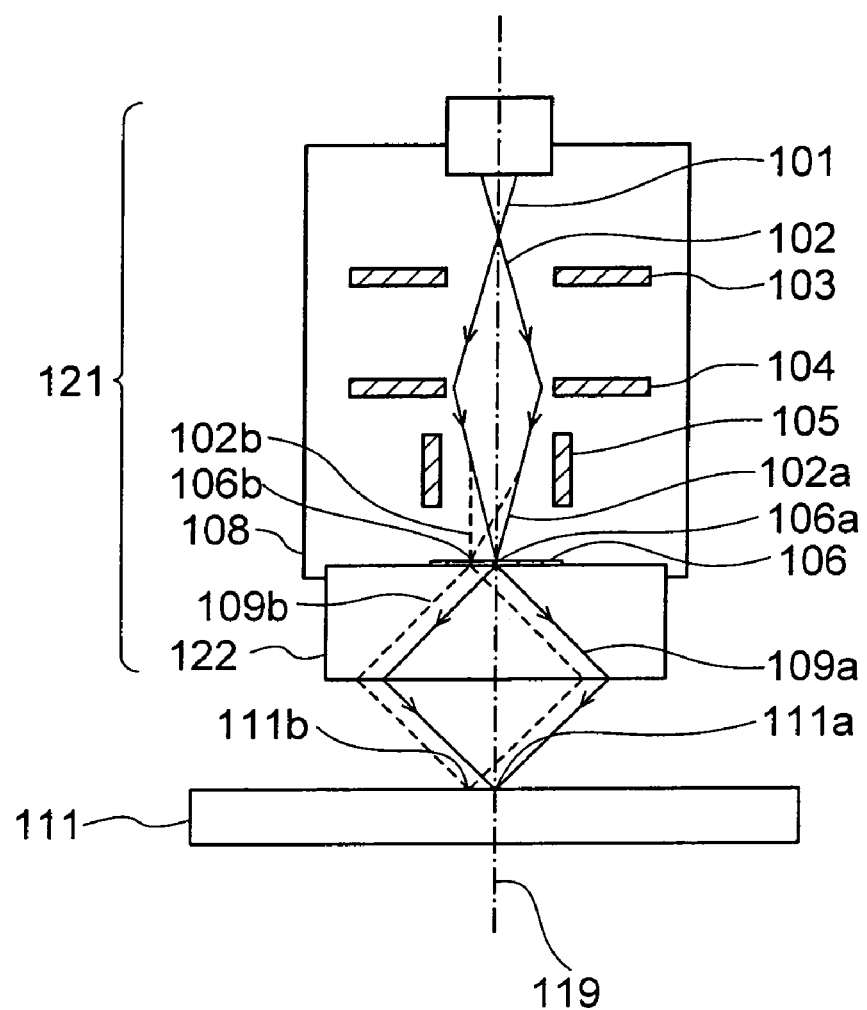
FIG. 4 is a diagram showing a schematic structure of the electron beam excitation light source in which, a light emitter thin film is formed to be a negative refraction lens used combinedly as an optical window in the first embodiment.

Next, an electron beam excitation light source in which a light emitter thin film is formed to be the negative refraction lens used combinedly as the optical window will be described below. FIG. 4 shows a schematic structure of an electron beam excitation light source 121 in which, the light emitter thin film is formed to be the negative refraction lens used combinedly as the optical window, which is a preferable form of the optical window and the negative refraction lens.

In this diagram, the light emitter thin film 106 is formed on an upper surface side of the optical window cum negative refraction lens 112, and at the same time, is mounted on the vacuum chamber 108. Accordingly, it is possible to have combined functions of both, the optical window 107 and the negative refraction lens 110 in FIG. 1.

Accordingly, since the optical window 107 made of an ordinary optical material such as glass is not used, it is possible to avoid an adverse effect due to absorption, scattering, and reflection which might occur at an optical window portion. Moreover, it is possible to avoid an effect of disruption of an optical path which is caused due to non-uniformity of a material forming the optical window.

Second Embodiment

Figure 5:
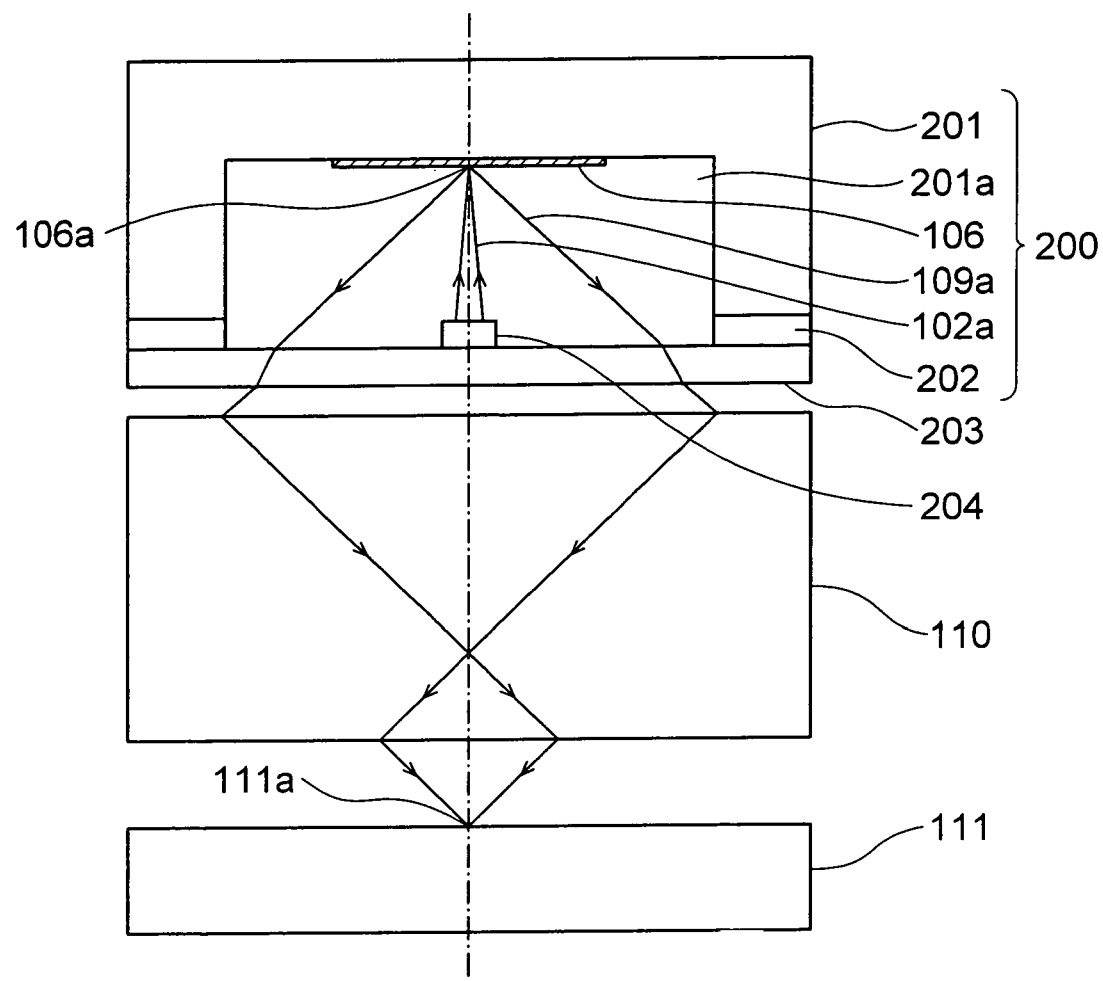
FIG. 5 is a diagram showing a schematic structure of an electron beam excitation light source by an ultracompact electron gun, according to a second embodiment of the present invention.
Figure 6:
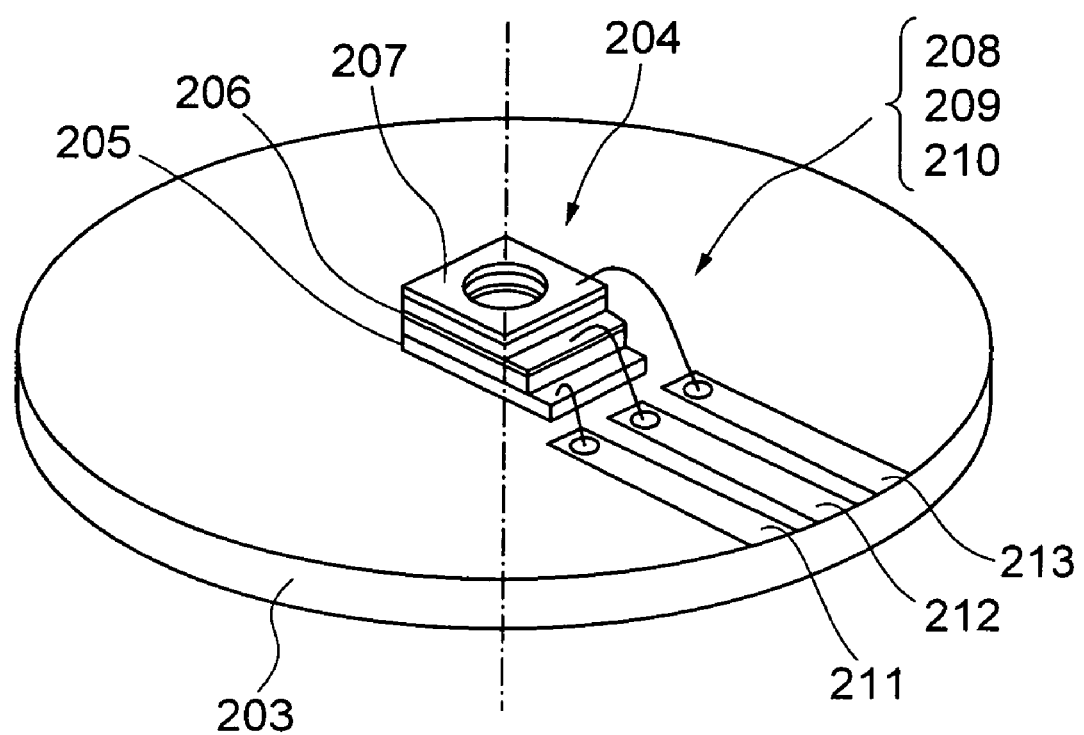
FIG. 6 is a diagram showing a perspective structure of the ultracompact electron gun in the second embodiment.
Figure 7:
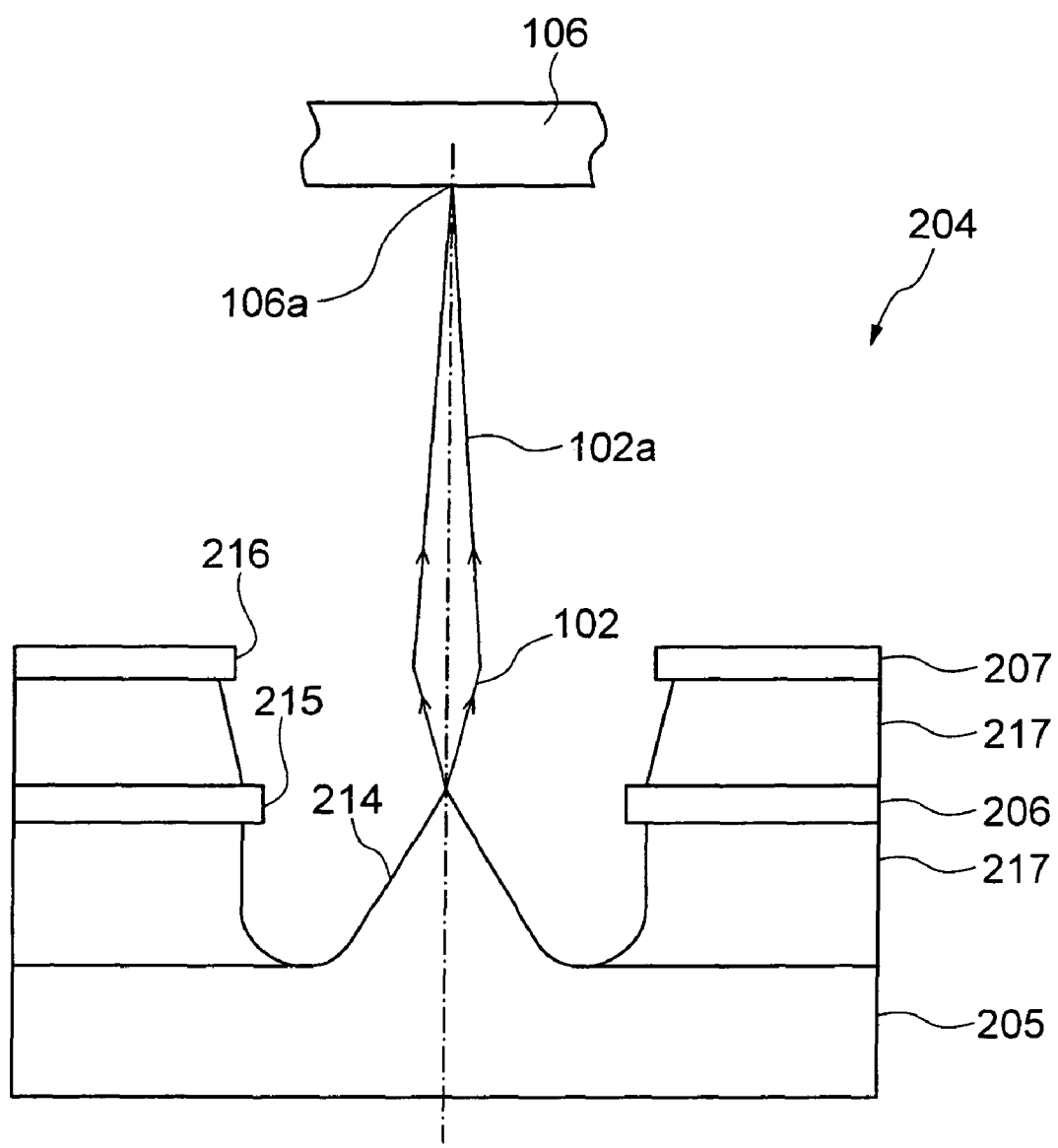
FIG. 7 is a diagram showing a cross-sectional structure of the ultracompact electron gun in the second embodiment.

Next, an electron beam excitation light source according to a second embodiment of the present invention will be described below. Same reference numerals are assigned to components same as in the first embodiment, and description to be repeated is omitted. FIG. 5 shows a schematic structure of an electron beam excitation light source 200 by an ultracompact electron gun. Moreover, FIG. 6 shows a perspective structure of the optical window and the ultracompact electron gun. FIG. 7 shows a cross-sectional structure of the ultracompact electron gun of the electron beam excitation light source 200.

In FIG. 5, a metal case 201 has an inside portion thereof air-tightened by a sealing material 202. An optical window 203 is formed of a transparent material, and is a substrate for allowing light to be transmitted, and for mounting the electron gun at a center. A ultracompact electron gun 204 has an emitter substrate layer 205, a gate electrode layer 206, and an electron lens electrode layer 207.

Furthermore, an emitter external wire 211 connects the emitter substrate layer 205 to an external circuit (not shown in the diagram). Similarly, a gate external wire 212 connects the gate electrode layer 206 to an external circuit (not shown in the diagram). An electron lens external wire 213 connects the electron lens electrode layer 207 to an external circuit (not shown in the diagram).

An emitter bonding wire 208 connects the emitter substrate layer 205 and the emitter external wire 211. A gate bonding wire 209 connects the gate electrode layer 206 and the gate external wire 212. An electron lens bonding wire 210 connects the electron lens electrode layer 207 and the electron lens external wire 213.

A cathode (emitter) 214 has a conical shape or a pyramid shape, and discharges electrons from a front end. A gate 215 makes electrons be discharged from a front end of the emitter by generating a high electric field in a front-end portion of the emitter 214, and makes this function as a field emission type cathode. An electron lens 216 is an electrostatic lens which narrows down an electron beam discharged from the front end of the emitter.

Insulating layer 217 electrically insulates between the emitter substrate layer 205, the gate electrode layer 206, and the electron lens electrode layer 207. An air pressure of an air tight space 201*a* inside the metal case 201 is maintained to be low so that the flow of the electron beam is not disturbed.

Electrons in the emitter 214 are discharged from the front end of the emitter 214 by a high electric field created by the gate 215, and become an electron beam 102. The electron beam 102 is converged by the electron lens 216, and becomes a converged electron beam 102*a*. The converged electron beam 102*a* is irradiated on the light emitter thin film 106.

An area of the light emitter thin film 106 irradiated by the converged electron beam 102*a* is excited by electrons which are irradiated, and emits light 109*a*, becoming the spot light source area 106*a*. The light 109*a* is transmitted through the optical window 203, and is incident of the negative refraction lens 110. The light incident is projected on the object 111 by the perfect imaging effect of the negative refraction lens 110. As a result of this, an image of the spot light source area 106*a* is formed as a spot illuminated area 111*a* on the object 111.

The electron beam excitation light source 200 shown in the second embodiment differs from the first embodiment at a point that, a function which deflects the electron beam is not provided. Regarding the rest of the structure, it has characteristics common as the electron beam excitation light source 100 shown in the first embodiment.

Furthermore, the electron beam excitation light source 200 has a peculiarity that it is possible to make the size extremely small. The ultracompact electron gun 204 is formed by a layered structure as shown in FIG. 6 and FIG. 7. Therefore, at the time of manufacturing, it is possible to use methods such as a lithography, an etching, a vapor deposition, and a sputtering which are technologies for manufacturing micro semiconductors and micro machines. As a result of this, it is possible to make the electron beam excitation light source 200 to be extremely small.

For example, an inner diameter of the gate 215 and the electron lens 216 is about 500 nm to 2 μm, and a height of the emitter 214 is about 500 nm to 2 μm. Consequently, it is possible to make the size small of about 1 mm length×1 mm breadth×0.5 mm thickness as the ultra small electron gun 204.

Moreover, an appropriate distance between the emitter 214 and the light emitter thin film 106 in such electron gun is about 1 mm to 5 mm. Therefore, as dimensions of the electron beam excitation light source 200, it is possible to make the size small with an outer diameter of about 3 mm to 10 mm and a thickness of about 3 mm to 8 mm. This embodiment, for such small size, is suitable for an application in an endoscope, a writing unit for an optical information equipment and a reading unit for an optical information equipment in which, it is necessary to make the size particularly small.

Moreover, in this embodiment, for stabilizing the electron beam 102*a*, a shape, a manufacturing method, and a material of the emitter 214 is important. As the shape of the emitter, it is desirable that it is a needle shape or a pyramid shape such as a pyramid or a cone shape with a pointed front end, and that a radius of curvature of the front-end portion is not more than 10 nm.

As a manufacturing method and a material of the emitter 214, in a case of manufacturing the emitter 214 by the vapor deposition or sputtering, niobium, molybdenum, and zirconium are desirable. Moreover, it is also possible to use silicon as a material. In this case, reactive ion etching (RIE) or orientation dependent etching (ODE) is desirable as a manufacturing method.

Moreover, it is possible to use carbon nanotube (CNT) and carbon nanohorn made of a six-membered ring and a five membered ring of carbon as a material.

For the reason same as described in the electroconductive layer light emitter thin film 114 in the first embodiment, in this embodiment also, it is desirable to form an electroconductive layer as a film on the surface of the light emitter thin film 106. In this embodiment, unlike in the first embodiment, a surface on which the electron beam 102*a* is irradiated with respect to the light emitter thin film 106 and a surface from which the light 109*a* is emitted are the same surface (surface at a lower side in FIG. 5).

Therefore, it is necessary to form as a film the electroconductive layer on this surface, through which both the electron beam and the light are transmitted. Consequently, in a case of using metal as a material of the electroconductive layer, since a transmissivity of light with respect to a metal is lower than the electron beam, as a condition for allowing the light to be transmitted, it is desirable to make a thickness of the electroconductive layer to be not more than 5 nm.

Moreover, in a case of using a transparent electroconductive material such as a zinc oxide material, indium oxide material, or a tin oxide material as a material of the electroconductive layer, as a condition for allowing the electron beam to be transmitted, it is desirable to make the thickness of the electroconductive layer to be not more than ten-odd nm.

Although the light emitter in FIG. 5 has been described as the light emitter thin film 106 made of a cathodoluminescent material, it is not restricted to this. In this embodiment, since the surface on which the electron beam 102a is irradiated and the surface from which the light 109a is emitted are the same surface as described above, it is possible to use even an emitter in a bulk form and not in the film form. In this case, there is an effect that, it is possible to use even the cathodoluminescent material for which, film forming is difficult physically. More preferably, even in this case, a point that, it is desirable to form the electroconductive layer as a film on the surface is same as in a case of each embodiment described above.

Each of the emitter external wire 211, the gate external wire 212, and the electron lens external wire 213 exists on the optical window 203, and shades a part of the light 109a. Consequently, for reducing a proportion of shading, it is desirable that a width of these wires is thin. Moreover, it is more desirable when the wires are formed of a transparent electroconductive material.

Figure 8:
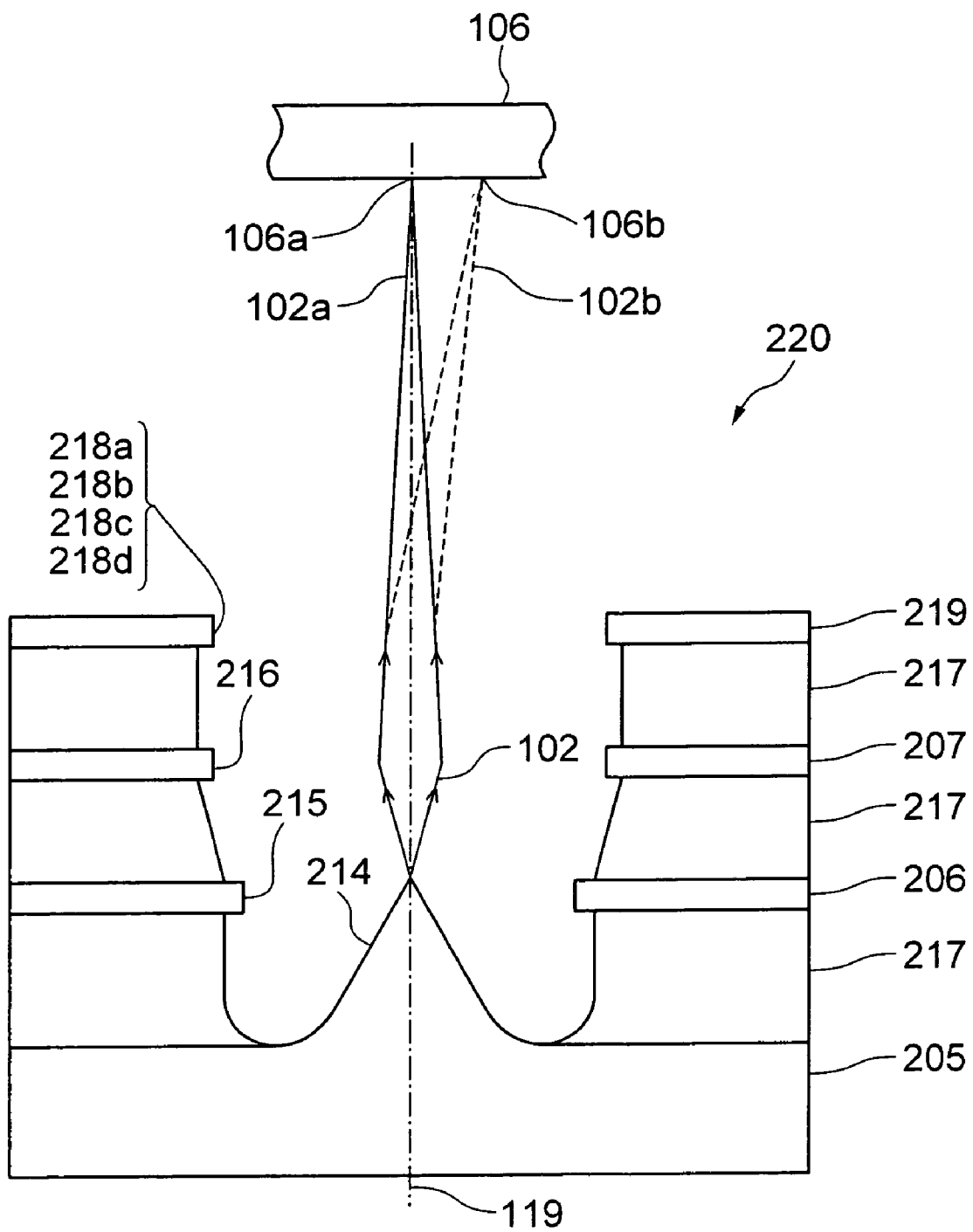
FIG. 8 is a diagram showing a cross-sectional structure of the ultracompact electron gun with a deflector in the second embodiment.
Figure 9:
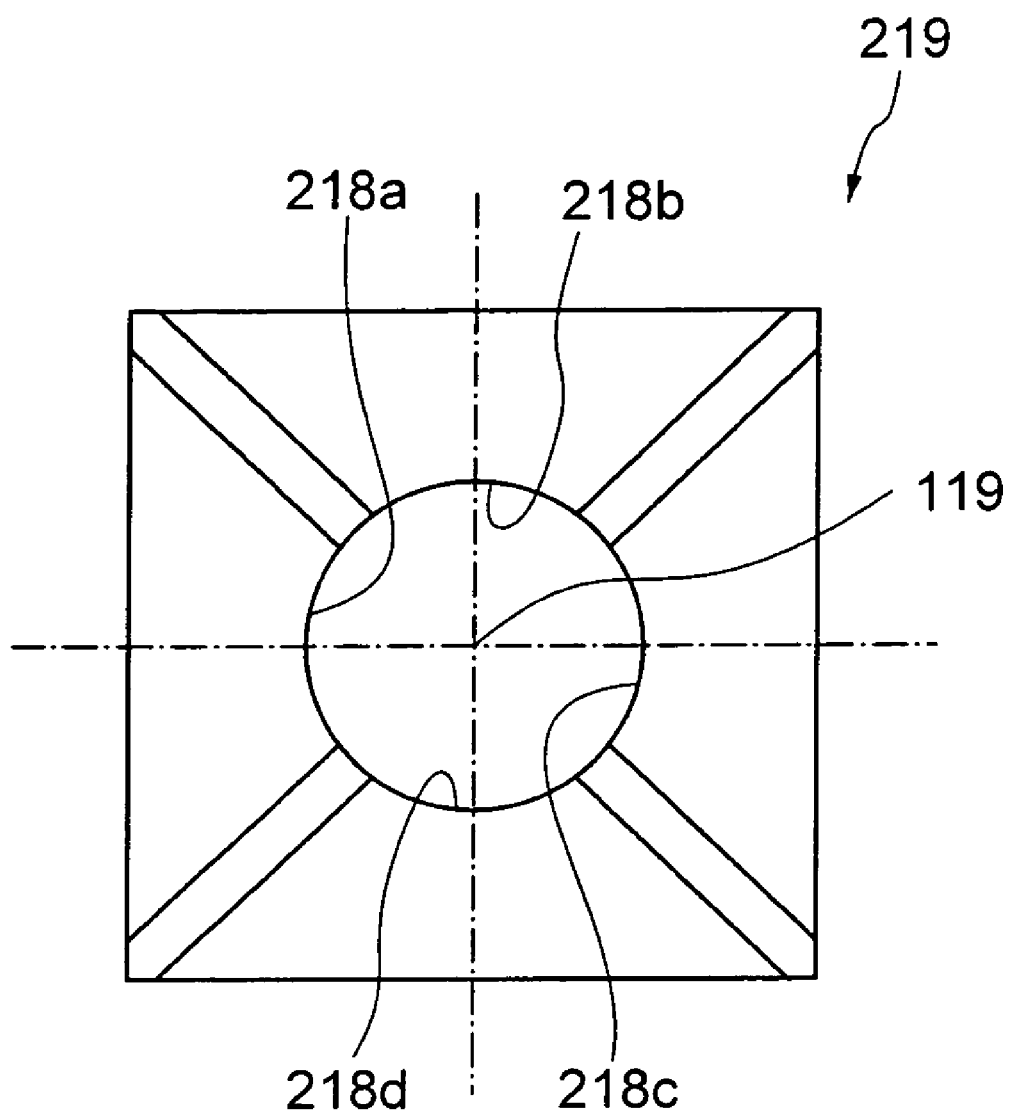
FIG. 9 is a diagram showing a schematic structure of the deflector in the second embodiment.

FIG. 8 shows a schematic cross-sectional structure of a ultracompact electron gun with deflector 220 which is a preferable form of the ultracompact electron gun in the second embodiment. Moreover, FIG. 9 shows an electrode shape of the deflector. In FIG. 8, an electrostatic electron beam deflector 218 deflects the electron beam. Moreover, a deflector electrode layer 219 is formed.

The ultracompact electron gun with deflector 220 has the deflector 218 added to the ultracompact electron gun 204 in the second embodiment. Moreover, by applying a voltage to four deflectors 218a, 218b, 218c, and 218d disposed on an outer periphery, it is possible to deflect the converged electron beam 102a in an arbitrary direction orthogonal to the central axis 119.

When the ultracompact electron gun with deflector 220 is used as the electron beam excitation light source in FIG. 5 instead of the ultracompact electron gun 204 described above, with each merit, starting with a possibility of making it ultracompact retained, a scanning of the illuminated area similarly as in the first embodiment becomes possible.

Third Embodiment

Figure 10:
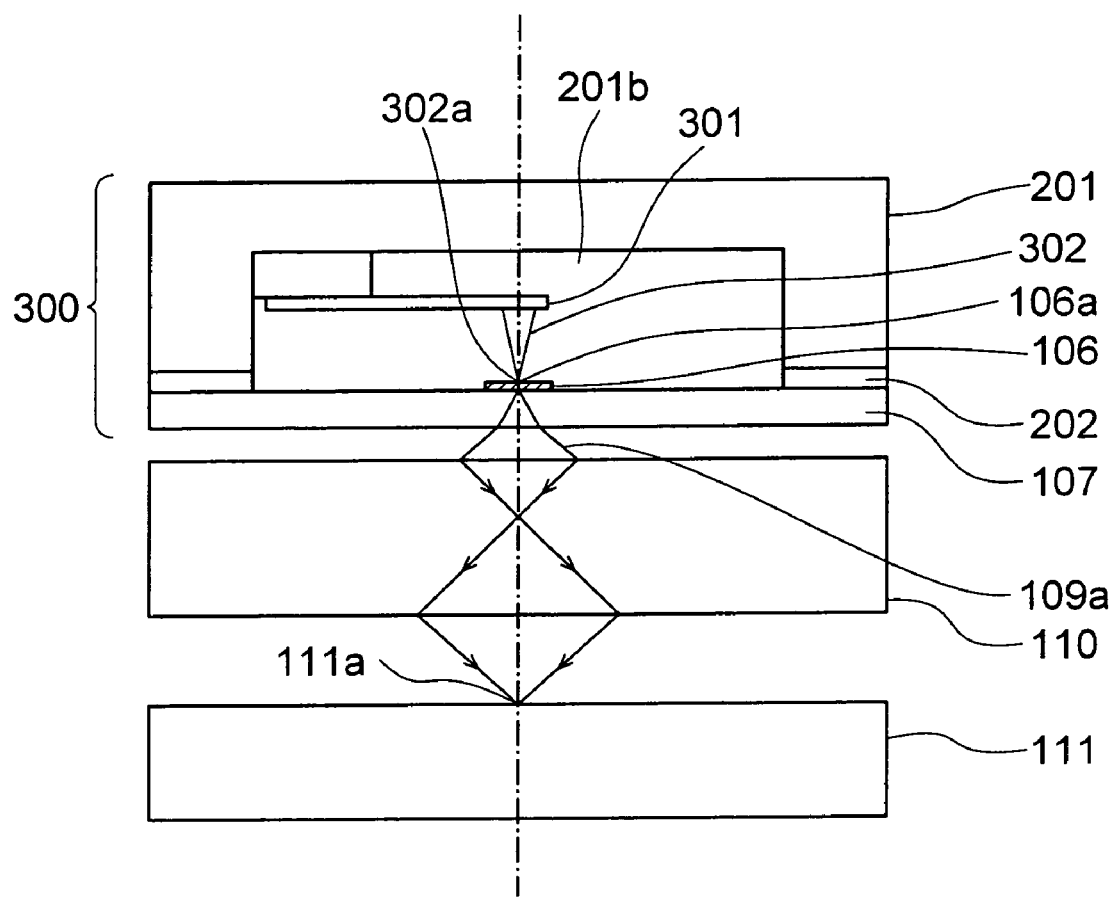
FIG. 10 is a diagram showing a schematic structure of a light source by a needle-shaped electrode according to a third embodiment of the present invention.
Figure 11:
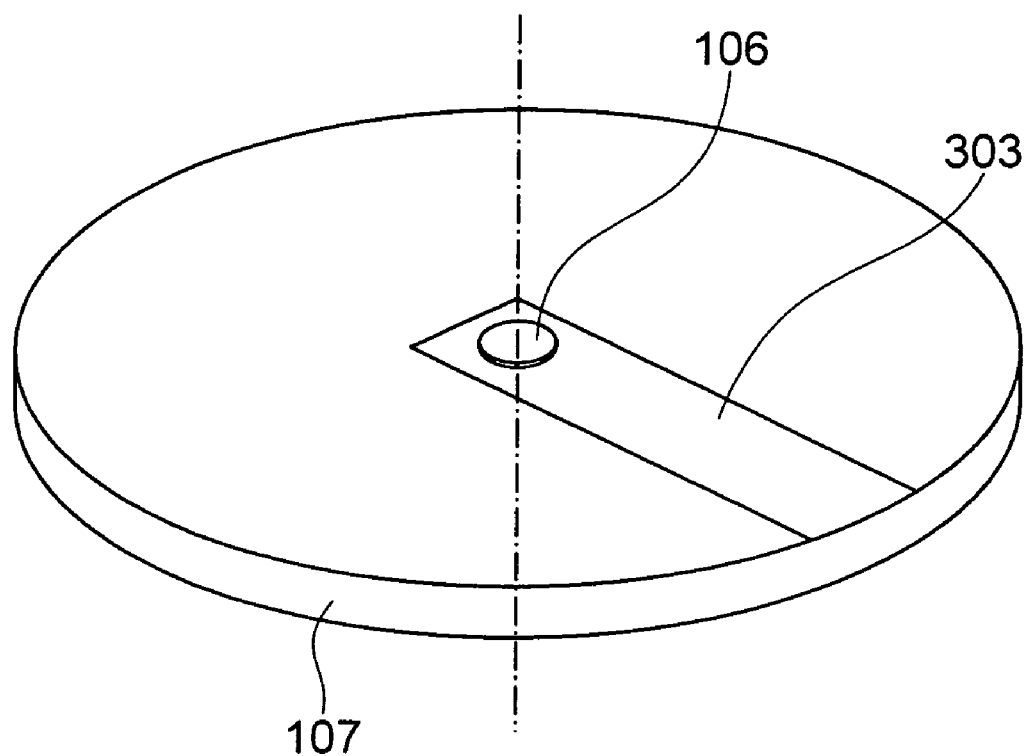
FIG. 11 is a diagram showing a schematic structure of a light emitter thin film in the third embodiment.

Next, a light source by a needle-shaped electrode according to a third embodiment of the present invention will be described below. Same reference numerals are assigned to components same as in the first embodiment, and the description to be repeated is omitted. FIG. 10 shows a schematic structure of a light source 300 by a needle-shaped electrode of this embodiment. Moreover, FIG. 11 shows an optical window and a light emitter thin film in the light source 300 by the needle-shaped electrode.

In this diagram, a cantilever 301 holds the needle-shaped electrode, as well as determines a position of the needle-shaped electrode with respect to the light emitter thin film 106. A needle-shaped electrode 302 is formed of an electroconductive material. Moreover, an electrode 303 is in pair with the needle-shaped electrode 302, and is for applying a voltage from both sides of the light emitter thin film 106. Moreover, the electrode 303 has also a function of an external wire for connecting this electrode to an external circuit (not shown in the diagram). Furthermore, the electrode 303 is a transparent electroconductive layer for allowing the light 109 emitted from the light emitter thin film 106 to be transmitted.

A front-end portion 302a of the needle-shaped electrode 302 has a conical shape, or a pyramid shape, or a needle shape with the front end pointed acutely, and it is desirable that a radius of curvature of the front end portion 302a is 10 nm or less. The front end portion 302a may be brought in contact with the light emitter thin film 106, or may be separated by a distance of flowing of a tunneling current, or in other words, a distance of about 1 nm or less. More preferably, as the cantilever 301, it is desirable to use a driving element such as a bimorph piezoelectric actuator, and to structure such that, a distance between the front-end portion 302a and the light emitter thin film 106 can be controlled arbitrarily.

When the front end portion 302a of the needle-shaped electrode makes a contact with the light emitter thin film 106, a size of a contact surface thereof is less than few nm in a diameter. In this state, a voltage is applied between the needle-shaped electrode 302 and the transparent electroconductive layer 303. Accordingly, a contact portion of the light emitter thin film 106 emits light, and this area becomes the spot light source area 106a.

Moreover, when the front-end portion 302a is away from the light emitter thin film 106, a tunneling voltage is applied between the needle-shaped electrode 302 and the transparent electroconductive layer 303. Accordingly, the tunneling current flows between the needle-shaped electrode 302 and an atom or a molecule forming the light emitter thin film 106 existing at the nearest position from the front-end portion 302a. With flowing of the tunneling current, one atom or molecule provides a tunnel emission. The needle-shaped electrode 302 corresponds to a probe, and the tunneling current and the tunneling voltage correspond to the energy.

In this case, the atom or the molecule which has provided the tunnel emission becomes the spot light source area 106a. An effect of an image of the light 109a emitted from the spot light source area 106a being formed as the spot illuminated area 111a on the object 111 via the optical window 107 and the negative refraction lens 110 is similar as in the first embodiment and the second embodiment.

The light source 300 by the needle-shaped electrode shown in this embodiment differs from the light source in the first embodiment at a point that, it is not provided with a function of scanning the spot illuminated area 111a. The rest of the structure has common characteristics as the electron beam excitation light source 100 shown in the first embodiment.

Furthermore, the light source 300 by the needle-shaped electrode has a characteristic that it can be made extremely small similarly as the electron beam excitation light source 200 by the ultracompact electron gun shown in the second embodiment. The reason for making it small is that, a means which applies voltage to the light emitter thin film 106 is the needle-shaped electrode 302 and the transparent electroconductive layer 303, and it is easy to make small both the means.

Moreover, the light source 300 by this needle-shaped electrode has a characteristic of having a capability to emit light stably when the front-end portion 302a of the needle-shaped electrode makes a contact with the light emitter thin film 106. Generally, it is not easy to maintain a surface condition of a substance stable at an atom level. Therefore, as compared to a case in which, the voltage is applied by irradiation of an electron beam on a surface of a light emitter, in a case of applying the voltage via the needle-shaped electrode 302 in contact with the light emitter thin film 106, an instability factor is small as the effect does not depend on the surface condition of the light emitter. As a result of this, a stable light emission is possible.

Furthermore, when the front-end portion 302a is away from the light emitter thin film 106, the light source 300 by the needle-shaped electrode forms an extremely minute spot illuminated area 106a of a level of an atom or a molecule. Consequently, it has a peculiarity of a possibility of realizing an extremely high spatial resolution of the level of an atom or a molecule, as the spot illuminated area 111a on the object 111. The reason for the extremely high spatial resolution is that, the tunnel emission which occurs due to the tunneling current, occurs for one atom or molecule forming the light emitter thin film 106.

In this embodiment, for making small an area of the spot light source area 106a and stabilizing further the light emission effect, a shape, a manufacturing method, and a material of the needle-shaped electrode 302 are important. Preferable conditions regarding the shape, the manufacturing method, and the material are same as in a case of the emitter 214 shown in the second embodiment. Preferable conditions as the transparent electroconductive layer 303 are same as in the case of the transparent electroconductive layer 113 shown in the first embodiment.

For maintaining the contact between the needle-shaped electrode 302 and the light emitter thin film 106 to be more stable, it is desirable that an air pressure of an air-tight space 201b inside the metal case 201 is maintained to be low, or that, an inert gas is filled in the air-tight space 201b.

As a material of the light emitter thin film 106, a substance which exhibits electroluminescence is suitable. As an electroluminescent material, a field-effect electroluminescent material or a current-injection electroluminescent material may be used.

Figure 12:
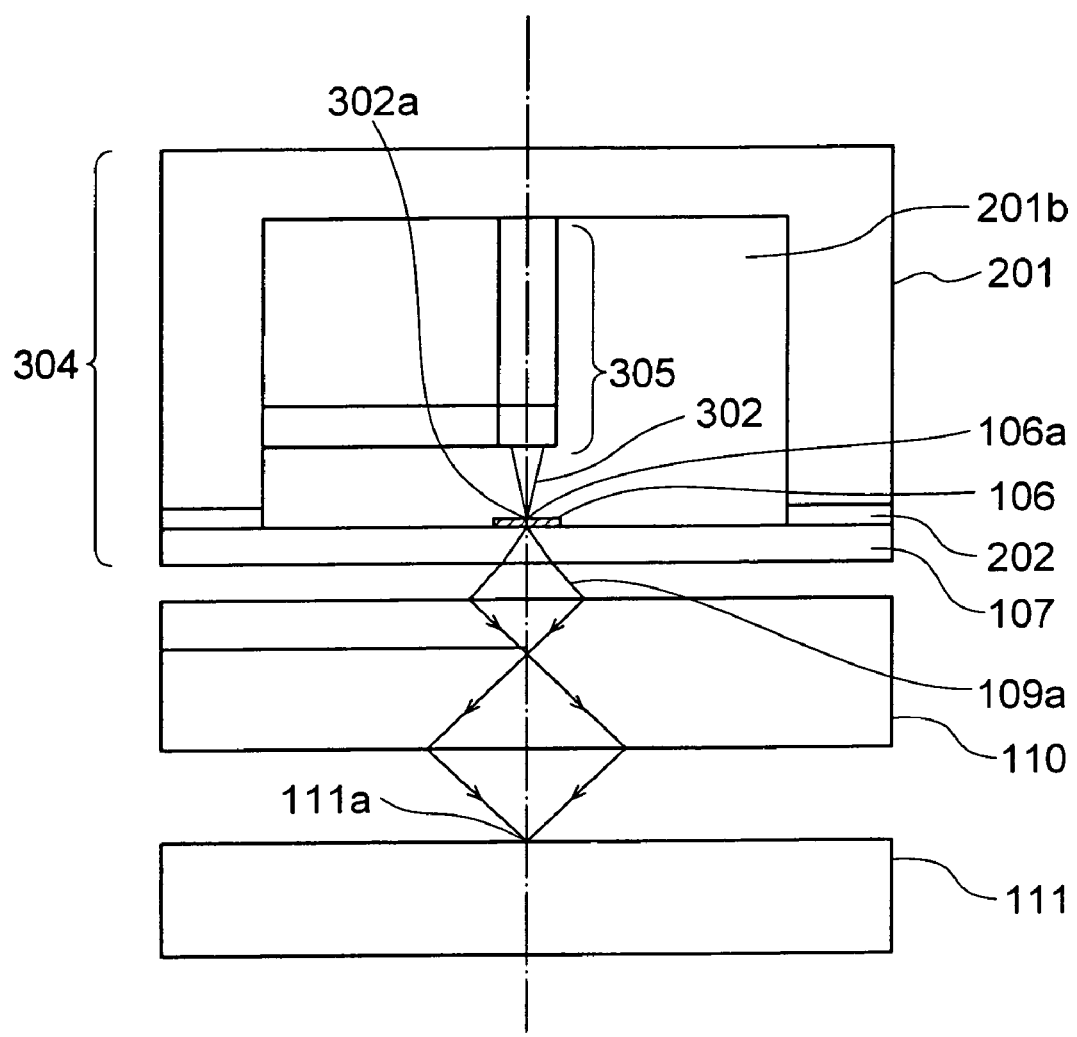
FIG. 12 is a diagram showing a schematic structure of a light source by a needle-shaped electrode with an actuator in the third embodiment.
Figure 13:
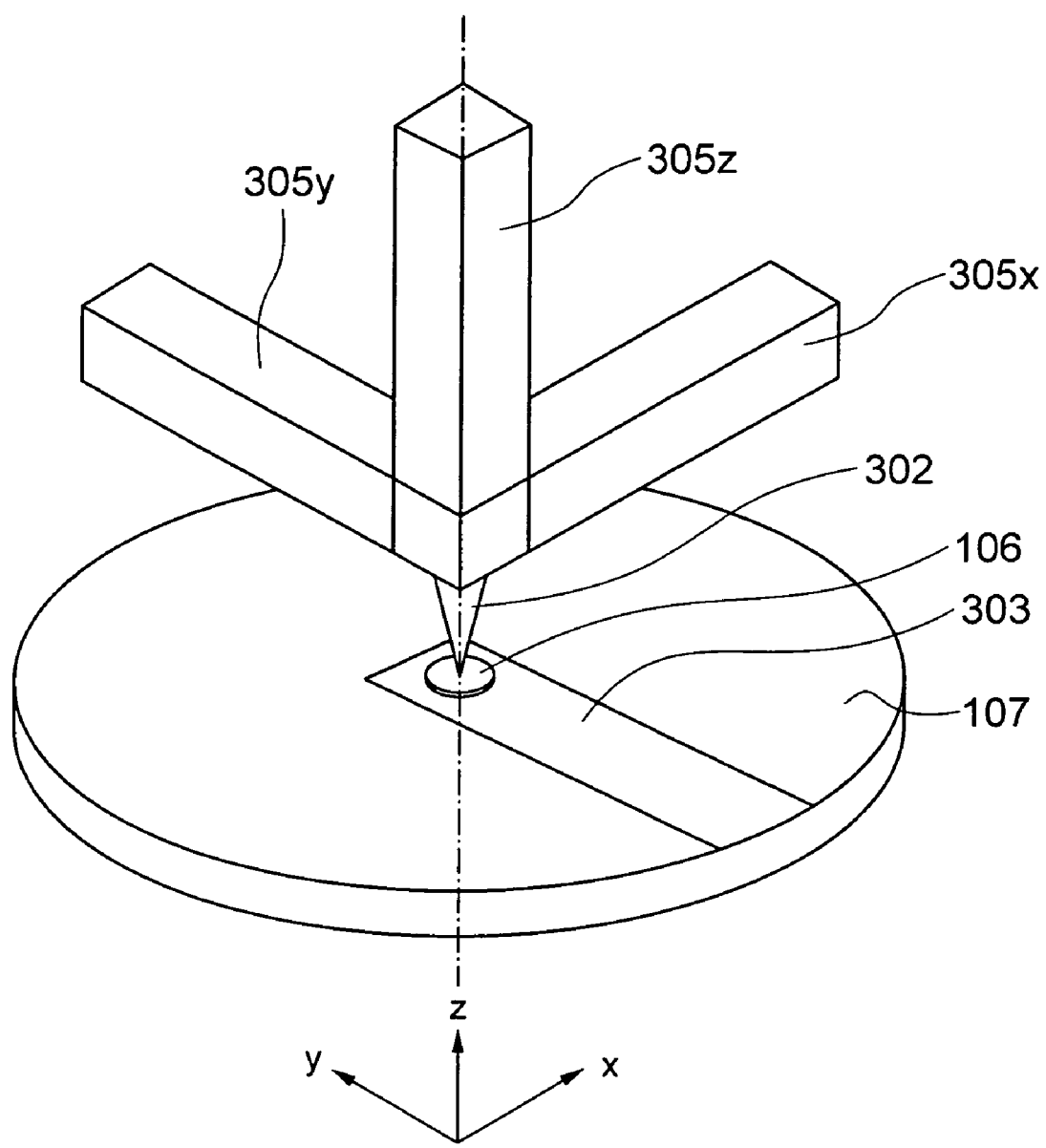
FIG. 13 is a perspective view showing a schematic structure of a surrounding of the needle-shaped electrode in the third embodiment.

As a field-effect electroluminescent material, the following materials can be used preferably.

diamond
ZnS: Cu
ZnS: Cu, Cl
ZnS: Cu, I
ZnS: Cu, Pb
ZnS: Cu, Al
ZnS: Cu, Mn
ZnS: Cu, Mn, Cl
ZnS—ZnSe: Cu, Br
ZnSe: Cu, Cl
ZnSe: Mn
ZnS—ZnSe: Cu, Al
ZnS: $PrF_3$
ZnS: $NdF_3$
ZnS: $SmF_3$
ZnS: $EuF_3$
ZnS: $TbF_3$
ZnS: $DyF_3$
ZnS: $HoF_3$
ZnS: $ErF_3$
ZnS: $TmF_3$
ZnS: $YbF_3$
ZnS: $CrF_3$
ZnS: $MnF_2$
$BaTiO_3$
$SrTiO_3$
$TiO_2$ FIG. 12 shows a schematic structure of a light source 304 by a needle-shaped electrode with an actuator which is a preferable form of a light source by a needle-shaped electrode in a third embodiment. Moreover, FIG. 13 shows a detailed state of a surrounding of the needle-shaped electrode of the light source 304.

A piezoelectric actuator 305 of three axes drives the needle-shaped electrode 302 in three directions orthogonal. The piezoelectric actuator 305 has a piezoelectric actuator 305x of X axis, a piezoelectric actuator 305y of Y axis, and a piezoelectric actuator 305z of Z axis.

The light source 304 by the needle-shaped electrode having actuator has a structure in which, the piezoelectric actuator 305 of three axes is added to the light source 300. It is possible to make the needle-shaped electrode 302 scan the light emitter thin film 106 in a direction in an xy plane by the piezoelectric actuator 305x of X axis and the piezoelectric actuator 305y of Y axis. Moreover, it is possible to control arbitrarily the distance between the front end portion 302a of the needle-shaped electrode and the light emitter thin film 106 by the piezoelectric actuator 305z of Z axis. When the light source 304 by the needle-shaped electrode with actuator is used, the scanning of the illuminated area similarly as in the first embodiment is possible, retaining all advantages of the light source by the needle-shaped electrode.

Fourth Embodiment

Next, an optical detector according to a fourth embodiment of the present invention will be described below. Same reference numerals are assigned to components which are same as in the first embodiment, and the description to be repeated is omitted. Firstly, an operation principle of an image pickup tube will be described prior to the description of the optical detector of this embodiment.

Figure 14:
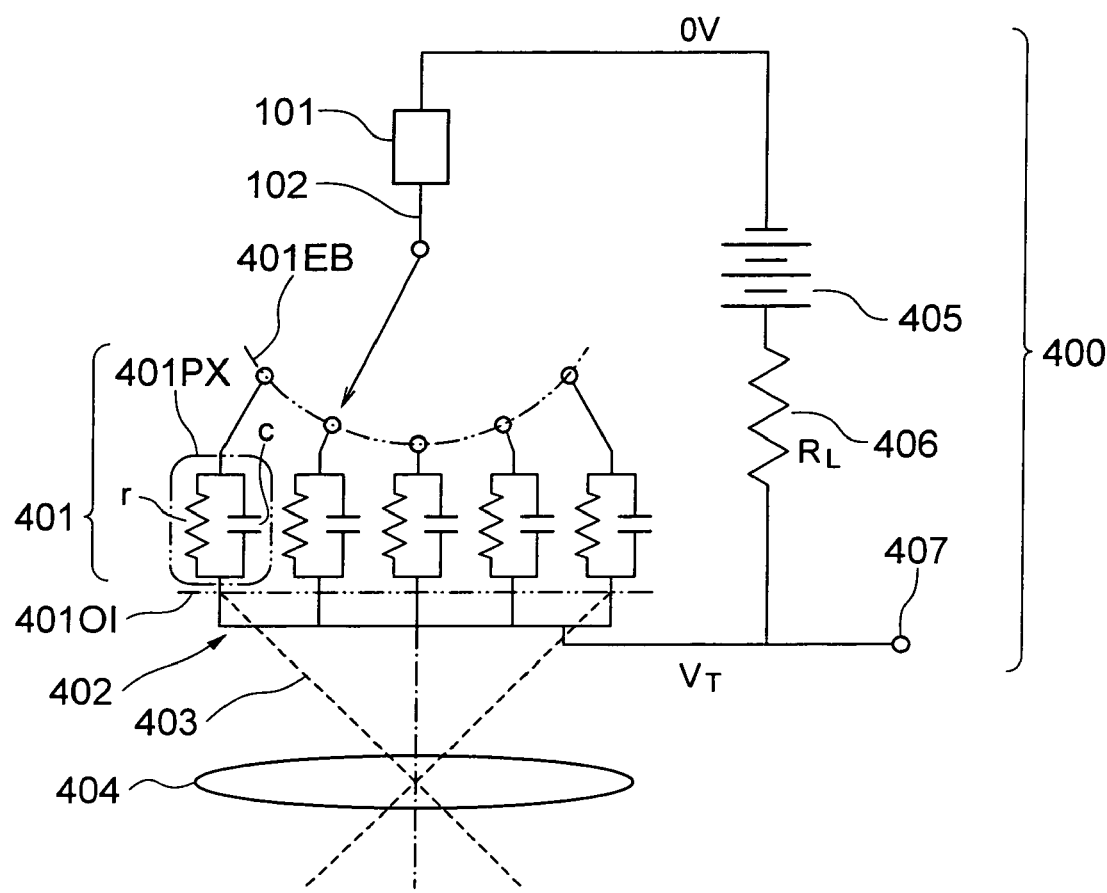
FIG. 14 is a diagram explaining an equivalent circuit of an image pickup tube.

FIG. 14 is an equivalent circuit describing an operation principle of an image pickup tube 400 in general. In this diagram, a photoelectric conversion film (target) 401 is made of a photoconductive material. The electron beam 102 is irradiated on a surface 401EB of the photoelectric conversion film (hereinafter appropriately called as 'target') 401, and an optical image is irradiated on a surface 401OI.

An area 401PX which is assumed as one pixel in the target 401, corresponds to a cross-sectional area of the electron beam 102, and forms a c-r time constant circuit between the surface 401EB on which, the electron beam is irradiated and the surface 401OI on which, the optical image is irradiated.

A transparent electroconductive film 402 is formed closely with the surface 401OI on which the optical image is irradiated. Light beam 403 which forms the optical image is emerged from a lens 404 which forms the optical image. Moreover, a DC power supply 405 and a load resistance $R_L$406 are connected, and an output signal terminal 407 is formed at an end portion.

A large number of the pixel areas 401PX exists on the target 401, and are arranged in a row. A resistance r of the pixel area 401PX changes according to an intensity of the light beam 403 irradiated. A target voltage $V_T$ is applied to the transparent electroconductive film 402.

The electron beam 102 is irradiated on the surface 401EB on which the electron beam is irradiated of the target 401, and the pixel areas 401PX are put ON or OFF in order by the scanning of the electron beam 102. A signal of a pixel which is ON is fetched from the output signal terminal 407 via the load resistance 406.

When the electron beam 102 is irradiated on one of the pixel areas 401PX, a switch is closed, and a capacitor c is charged. Therefore, an electric potential of the surface 401EB on which the electron beam is irradiated becomes same as (an electric potential of) the cathode 101 to which the electrons are discharged, and becomes 0 V in a case of the diagram.

Next, when the electron beam 102 is away from the pixel area 401PX, the switch is opened, and an electric charge which is charged in the capacitor c is discharged via the resistance r. When the light falling on the pixel is strong, the discharging is fast as the resistance r is low, and the electric potential of the surface 401EB on which the electron beam is irradiated becomes high. When the light falling on the pixel is weak, there is almost no discharging as the resistance is high, and arise in the electric potential of the surface 401EB on which the electron beam is irradiated, is small.

Next, when the electron beam 102 is irradiated again after elapsing of a predetermined time, the electric potential which rose at the surface 401EB of each pixel area 401PX is again dropped down to cathode electric potential. At this time, an electric charge for the charging of the capacitance c flows as a signal current through the load resistance. Moreover, a voltage drop occurred in this case is fetched as a signal voltage from the output signal terminal 407. In this manner, the image pickup tube 400 outputs the photoelectric conversion signal for each pixel area 401PX from the output signal terminal 407 in a time series.

Figure 15:
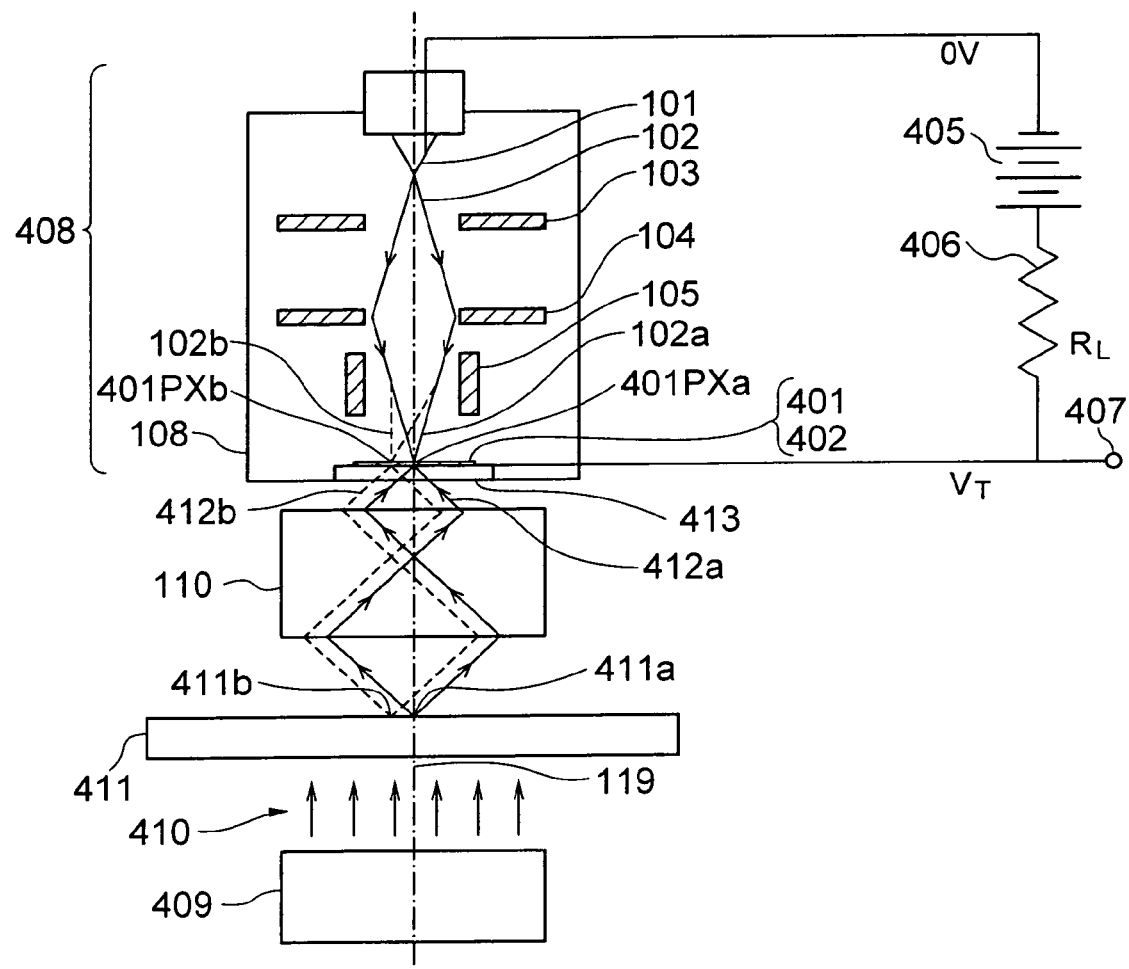
FIG. 15 is a diagram showing an image pickup tube detector according to a fourth embodiment of the present invention.
Figure 16:
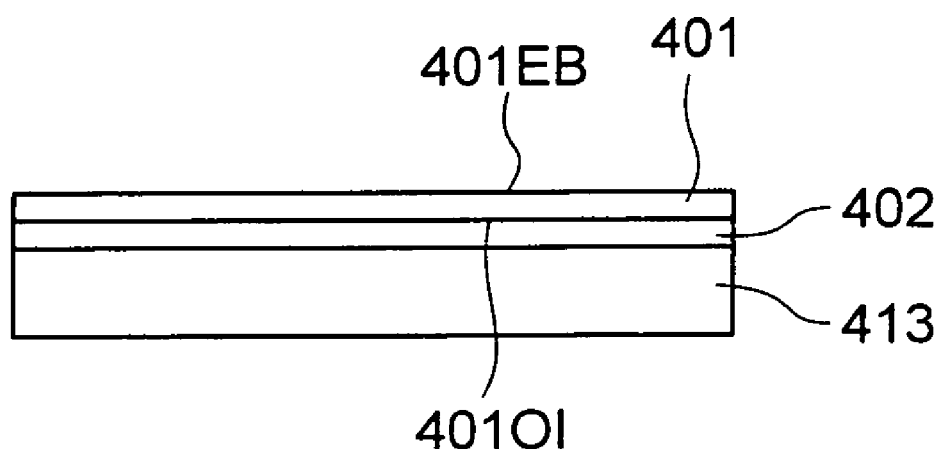
FIG. 16 is a diagram showing a cross-sectional structure of an optical window and a target in the fourth embodiment.
Figure 17:
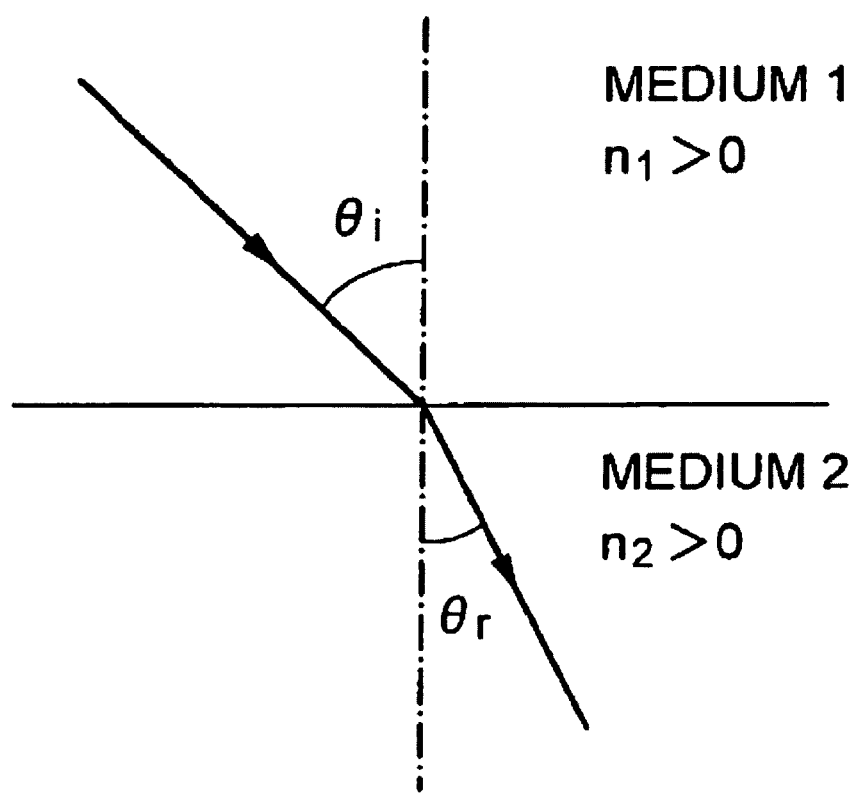
FIG. 17 is a diagram showing refraction of light in an ordinary optical material.
Figure 18:
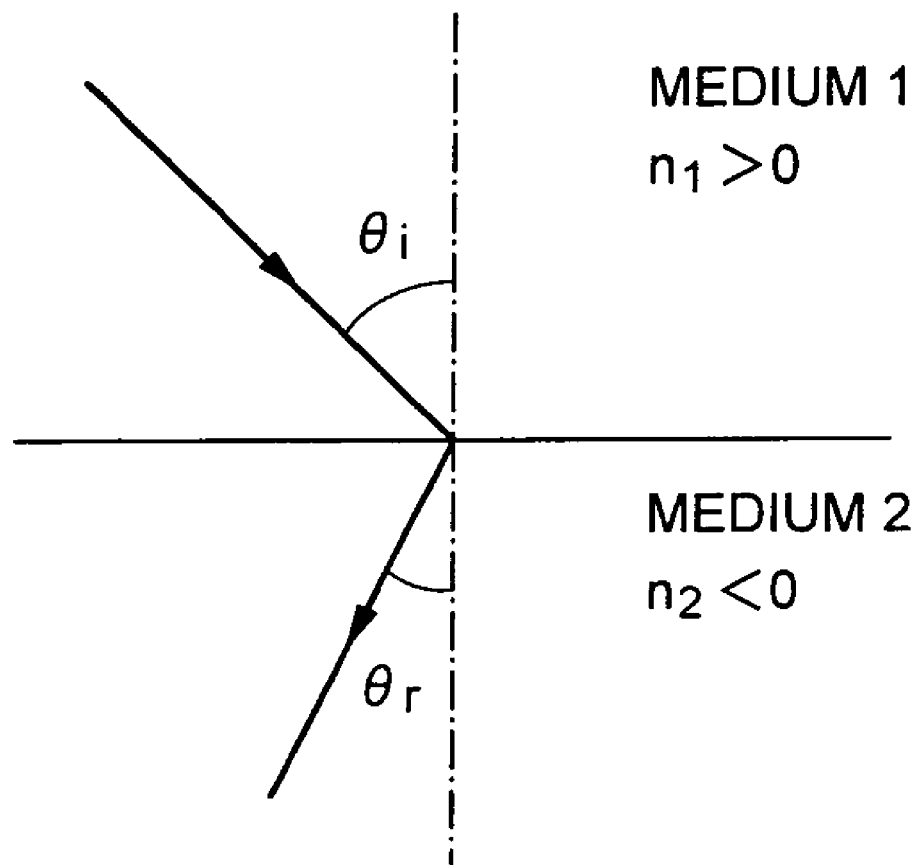
FIG. 18 is a diagram showing refraction of light in a material having a negative refractive index.
Figure 19:
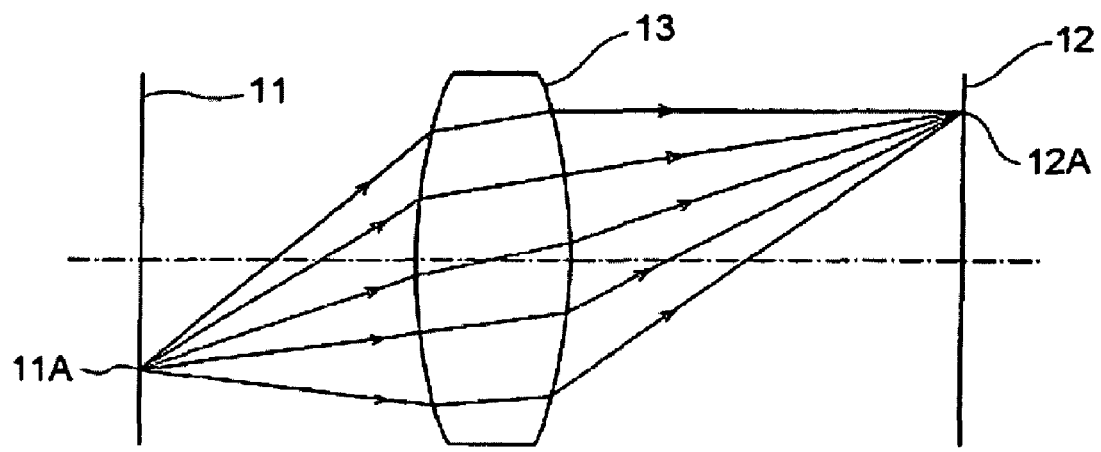
FIG. 19 is a diagram showing an imaging relationship by a convex lens in which, an ordinary optical material is used.
Figure 20:
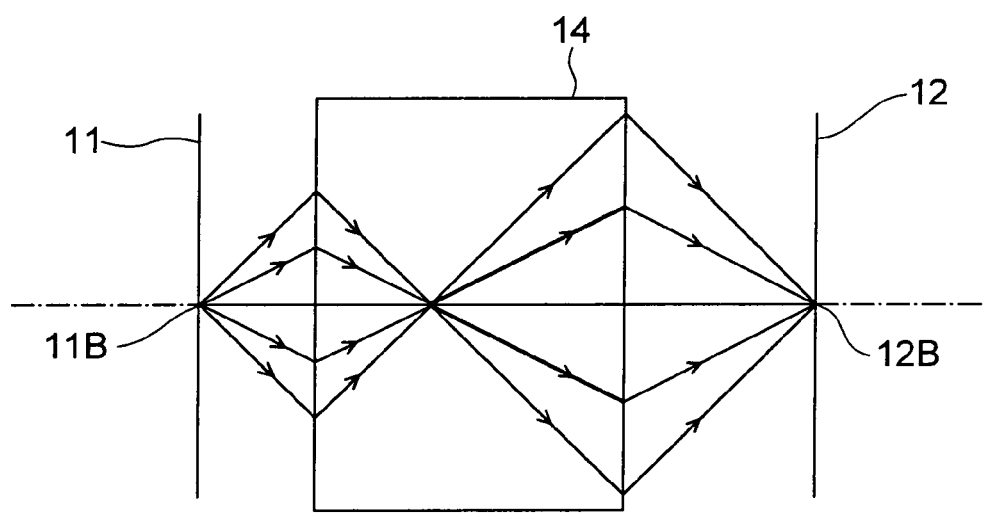
FIG. 20 is a diagram showing an imaging relationship by a negative refraction lens.

FIG. 15 shows a schematic structure of an image pickup tube optical detector 408 according to the fourth embodiment of the present invention. Moreover, FIG. 16 shows an optical window and a target of the image pickup tube optical detector 408. Here, a light source 409 irradiates an illuminating light 410. An optical information detecting object 411 illuminated by the illuminating light 410 emits object light 412.

A structure of the image pickup tube optical detector 408 is similar to the electron beam excitation light source 100 shown in FIG. 1 of the first embodiment, but differs at a point that, an object illuminated by the electron beam 102 is not the light emitter thin film 106 but the photoelectric conversion film (target) 401 made of a photoconductive material, at a point of having the transparent electrode 402 all the time, and at a point of having the DC power supply 405, the load resistance 406, and the output signal terminal 407. According to these structures, the image pickup tube optical detector 408, similar to the image pickup tube 400 in general which is described in FIG. 14, has a photoelectric conversion function of an optical image.

Whereas, the object light 412 emitted by the optical information detecting object 411 forms an image on a side of the surface 401OI on which the optical image of the target 401 is irradiated via the negative refraction lens 110. As a result of this, the optical image which is formed is subjected to the photoelectric conversion at the target 401, and a signal thereof is fetched from the output signal terminal 407.

The converged electron beam 102a in the image pickup tube optical detector 408, similarly as the converged electron beam in the electron beam excitation light source 100 of the first embodiment, is narrowed to a diameter of about 1 nm to 0.1 nm. The converged electron beam 102a is irradiated on the surface 401EB of the target on which the electron beam is irradiated, and the area irradiated becomes the pixel area 401PX.

The pixel area 401PX has a conjugate relationship with a pixel conjugate area 411a on the optical information detecting object 411 due to a perfect imaging effect of the negative refraction lens 411. This, in other words, means that a detector having a diameter same as of the converged electron beam 102a detects light on the optical information detecting object 411. In this manner, from the cathode 101 which corresponds to the probe, the converged electron beam 102a (energy) is applied on an area smaller than a diffraction limit of the object light with respect to the target 401 which is an optical detection body.

Consequently, according to this embodiment, it is possible to detect an intensity distribution of light on the optical information detecting object 411 by an optical detector having a diameter same as in a case of carrying out by an electron beam, in other words, a diameter of about 1 nm to 0.1 nm, which was not possible so far. Moreover, it is possible to deflect the converged electron beam 102a in a direction orthogonal to the central axis 119 by the deflector 105. That action and effect are similar as in the case of the first embodiment.

In this embodiment, by applying an object for which, a detection of fine and high resolution light is necessary, to the optical information detecting object 411, applications in various fields are possible. In other words, when an optical information equipment medium such as an optical disc is applied as the optical information detecting object 411, it becomes a reading unit for an optical information equipment, and moreover, when an object for observation of optical image is applied, it is possible to use as an optical image observation unit such as a camera and a microscope.

The object light 412 in FIG. 15 is characterized as transmission light from the optical information detecting object 411. However, by selecting appropriately a type and arrangement of the light source 409, it is possible to detect all types of object lights which the optical information detecting object 411 emits, such as fluorescent light, reflected light, forward-scattered light, backscattering light, and Raman scattering light.

Moreover, in FIG. 15, the electric potential of the cathode 101 is let to be 0 V, and the positive electric potential of the transparent electrode 402 is let to be positive voltage ($V_T$). However, the cathode may be let to be negative voltage, and the transparent electrode 402 may be let to be 0 V. Moreover, the cathode may be let to be negative and the transparent electrode may be let to be positive.

As a material of the target 401, any material may be used provided that it is a photoconductive material, and particularly, a target film used for the image pickup tube is appropriate. The following (substances) can be used preferably.

antimony trisulfide film ($Sb_2S_3$)
lead monoxide (litharge) film (PbO)
cadmium selenide film (CdSe)
saticon film (Se—As—Te)
newvicon film ($\{ZnSe—(Zn_{1-x}Cd_xTe)_{1-y}(In_2Te_3)_y\}$)
amorphous selen (selenium) film (a-Se)
super HARPICON (high-sensitivity pickup tube) film (Se—As—Te)
amorphous silicon film (a-Si)

As it has been described above, it is needless to mention that by replacing the target 401 of the light emitter thin film 106 in the lighting system shown in the first embodiment, and further adding the photoelectric conversion signal detector circuit, even in the second embodiment and the third embodiment, by the application of the target 401 and the photoelectric conversion signal detector circuit, it becomes a light detector having a high spatial resolution, similarly as it becomes the optical detector shown in the fourth embodiment.

Moreover, the spot illuminated area 111a in the lighting system and the pixel conjugate area 411a in the optical detector, both have a small size with a diameter of about 1 nm to 0.1 nm. Therefore, it is needless to mention that by applying both of these to one object, and making the spot illuminated area 111a and the pixel conjugate area 411a coincide, it is possible to form an extremely superior confocal optical system.

Furthermore, the present invention is not restricted to any of the embodiments described above, and it is needless to mention that various applications which fall within the basic teachings herein set forth are possible.

Industrial Applicability

As it has been described above, the present invention is useful in a lighting system and an optical detector which have a negative reflection lens and a high spatial resolution.

The invention claimed is:

1. A lighting system comprising:
    an electron supplying source which supplies an electron to a spot light source area;
    a light emitter which emits a light by receiving the electron supplied to the spot light source area; and
    an optical system which includes a negative refraction lens which is formed of a material exhibiting negative refraction, and which projects the light emitted from the light emitter on an object,
    wherein a size of the spot light source area is smaller than a diffraction limit determined by a wavelength of the light emitted from the light emitter.

2. The lighting system according to claim 1, wherein the electron supplying source is an electron gun or a needle-shaped electrode.

3. The lighting system according to claim 1, further comprising an electron lens which converges the electron supplied by the electron supplying source and irradiates the spot light source area.

4. The lighting system according to claim 3, wherein the size of the spot light source area is equal to or less than 1 nm.

5. The lighting system according to claim 1, further comprising an anode which accelerates the electron disposed between the electron supplying source and an electron lens.

6. The lighting system according to claim 1, further comprising a deflector which deflects the electron disposed between the electron supplying source and an electron lens.

7. The lighting system according to claim 1, wherein the lighting emitter is made of an electroconductive material.

8. The lighting system according to claim 1, wherein the electron supplying source and the light emitter are accommodated in a vacuum chamber.

9. A method of lighting comprising:
    an electron supplying step of supplying an electron to a spot light source area;
    a light emitting step of emitting a light by receiving the electron supplied to the spot light source area; and
    an optical step using a negative refraction lens which is formed of a material exhibiting negative refraction, and of projecting the light emitted from the light emitter step on an object,
    wherein a size of the spot light source area is smaller than a diffraction limit determined by a wavelength of the light emitted in the light emitting step.

* * * * *